US009992048B2

United States Patent
Hu et al.

(10) Patent No.: US 9,992,048 B2
(45) Date of Patent: Jun. 5, 2018

(54) SYSTEMS AND METHODS FOR DETECTING UNUSED COMMUNICATION SPECTRUM

(71) Applicant: The Board of Trustees of the University of Alabama, Tuscaloosa, AL (US)

(72) Inventors: Fei Hu, Tuscalossa, AL (US); Mengcheng Guo, Sunnyvale, CA (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days. days.

(21) Appl. No.: 15/088,431

(22) Filed: Apr. 1, 2016

(65) Prior Publication Data

US 2017/0093603 A1    Mar. 30, 2017

Related U.S. Application Data

(60) Provisional application No. 62/142,057, filed on Apr. 2, 2015.

(51) Int. Cl.
*H04B 1/00* (2006.01)
*H04L 27/00* (2006.01)
*H04B 1/7103* (2011.01)

(52) U.S. Cl.
CPC ....... *H04L 27/0006* (2013.01); *H04B 1/7103* (2013.01); *H04B 2201/692* (2013.01); *H04B 2201/709709* (2013.01)

(58) Field of Classification Search
CPC .......... H04B 2201/692; H04L 27/0006; H04L 27/0012

USPC ......................................................... 375/148
See application file for complete search history.

(56) References Cited

U.S. PATENT DOCUMENTS

| | | | | |
|---|---|---|---|---|
| 2011/0164745 A1* | 7/2011 | Marzetta | ................. | H03M 7/30 380/28 |
| 2012/0309444 A1* | 12/2012 | Wu | ....................... | H04W 16/14 455/517 |
| 2016/0269205 A1* | 9/2016 | Anthony | ............. | H04L 27/0012 |

OTHER PUBLICATIONS

Zhu et al, Cyclostationarity-based wideband spectrum sensing using random sampling. Global Conference on Signal and Information Processing (GlobalSIP), 2013 IEEE, Issue date Dec. 3-5, 2013.*

(Continued)

*Primary Examiner* — Kevin M Burd
(74) *Attorney, Agent, or Firm* — Meunier Carlin & Curfman LLC

(57) ABSTRACT

Systems and methods for cognitive radio spectrum sensing of a signal are disclosed herein. On exemplary method comprises applying a pre-defined cyclostationary feature to detect the presence of the signal; detecting the signal; detecting a spectrum associated with the signal; sampling randomly the detected signal from its cyclic frequency domain; and applying a compressive sensing algorithm to classify the signal based on the cyclostationary feature. The signal can be sparse in time, space, frequency, or code domains. Thereby, the systems and methods described in the present disclosure involve exploiting compressive sensing in a specific sparse domain (i.e., cyclic domain) and also utilize a cyclostationary feature based compressive spectrum sensing scheme to perform spectrum analysis.

20 Claims, 24 Drawing Sheets

(56) References Cited

OTHER PUBLICATIONS

"Compressive Sensing Signal Detection Algorithm Based on Location Information in Sparse Coefficients." Bing Liu et al. Nov. 2010, International Journal of Digital Content Technology and its Applications. vol. 4, No. 8. pp. 79-85.*
"Centralized Collaborative Sensing of Wideband Spectrum of Cogniative Radios." Moussavinik et al. 2010. Dept. of Elctronics and Telecommunication, Norwegian University of Science and Tecnology, NTNU, N-7491, Trodheim, Norway. pp. 1-6.*
Bahl, et al., "RADAR: an in-building RF-based user location and tracking system", 19th Annual Joint Conference of the IEEE Computer and Communications Societies, INFOCOM vol. 2, 2000, 775-784.
Chandramouli, et al., "Battery power-aware encryption", ACM Transactions on Information and System Security (TISSEC) 9 (2), 2006, 162-180.
Chen, et al., "GRAIL: a general purpose localization system", Sensor Review Localization Systems, vol. 28, 2008, 115-124.
Datasheet: TR1000 916.50 MHz Hybrid Transceiver, RF Monolithics, Inc., Published Apr. 21, 2015, 12 pages Accessed on line: http://www.rfm.com/products/data/tr1000.pdf.
Doomun, et al., "Energy consumption and computational analysis of rijndael-AES", AES, 3rd IEEE/IFIP International Conference in Central Asia on Internet, 2007, 1-6.
Ferguson, Game Theory, Part II.3, http://www.math.ucla.edu/~tom/GameTheory/Contents.html. 2014, 96 pages.
Futaci, et al., "On modeling energysecurity trade-offs for distributed monitoring in wireless ad hoc networks", IEEE Military Communications Conference, 2008, 1-7.
Liu, et al., "A Game Theoretic Approach to Efficient Mixed Strategies for Intrusion Detection", IEEE International Conference on Communications, 2006, 2201-2206.
Ma, et al., "Soft Combination and Detection for Cooperative Spectrum Sensing in Cognitive Radio Networks", IEEE Transactions on Wireless Communications, 2008, 4502-4507.
Ma, et al., "The Intrusion Detection Method based on Game Theory in Wireless Sensor", IEEE, 2008, 326-331.
Michaelides, et al., "Subtract on Negative Add on Positive (SNAP) Estimation Algorithm for Sensor Networks", EEE International Symposium on Signal Processing and Information Technology, 2007, 86-91.
Misra, et al., "Energy efficient learning solution for intrusion detection in Wireless Sensor Networks", Second International Conference on Communication Systems and Networks, 2010, 1-6.
Ocakoglu, et al., "Energy efficient random sleep-awake schedule design", IEEE Communications Letters 10(7), 2006, 528-530.
Otrok, et al., "A Moderate to Robust Game Theoretical Model for Intrusion Detection in MANETs", IEEE International Conference on Wireless and Mobile Computing, 2008, 608-612.
Qian, et al., "Energy Efficient Sensing of Non-cooperative Events in Wireless Sensor Networks", 40th Annual Conference on Information Sciences and Systems, 2006, 93-98.
Rodionov, et al., "Robust estimation of Gaussian-noise variance in the presence of pulse interference", Radiophysics and Quantum Electronics, vol. 48, No. 1, 2005, 68-76.
Shi, et al., "Efficient cooperative detection for wireless sentinel networks", 44th Annual Conference on Information Sciences and Systems (CISS), 2010, 1-6.
Subbalakshmi, et al., "Energy Efficient Wireless Encryption", 3rd IEEE Global Telecommunications Conference, 2006, 1-5.
Tang, "A RSSI-Based Cooperative Anomaly Detection Scheme for Wireless Sensor Networks", International Conference on Wireless Communications, Networking and Mobile Computing, 2007, 2783-2786.
Wang, et al., "Energy-efficient Coverage for Target Detection in Wireless Sensor Networks", 6th International Symposium on Information Processing in Sensor Network, 2007, 313-322.
Zhang, et al., "Intrusion Detection in Wireless Ad Hoc Networks", 6th International Conference Mobile Comp. and Net., 2000, 275-283.
Zhang, et al., "Optimization of cooperative spectrum sensing with energy detection in cognitive radio networks", IEEE Transactions on wireless communications 8(12), 2009, 5761-5766.

* cited by examiner

PU PATTERN

SYSTEMS AND METHODS FOR DETECTING UNUSED COMMUNICATION SPECTRUM

CROSS-REFERENCE TO RELATED APPLICATION

This application claims priority to, and the benefit of, U.S. Provisional Application No. 62/142,057, filed Apr. 2, 2015, titled "SYSTEMS AND METHODS FOR DETECTING UNUSED COMMUNICATION SPECTRUM," which is incorporated by reference herein in its entirety.

GOVERNMENT LICENSE RIGHTS

This invention was made with government support under AFRL US DOD #8750-13-1-046 awarded by the Air Force Research Laboratory of the U.S. Department of Defense. The government has certain rights in the invention.

TECHNICAL FIELD

The present disclosure relates generally to detecting idle channels in wireless communication spectrum and, more particularly, to systems and methods for detecting unused communication spectrum using non-reconstructive, compressive spread spectrum sensing through the cyclostationary domain.

BACKGROUND

Currently, wireless transmission is a key information sharing method due to their wireless radio propagation nature. Among wireless technologies, cognitive radio networks (CRNs) have become a promising platforms due to their capabilities of exploring any unused radio spectrum for information transmission. CRN is a type of spectrum-agile wireless network. Spectrum sensing can be a function on the front end of the cognitive radio (CR) system and can be designed to detect a primary user's signals. It can be used to detect and identify data traffic patterns of licensed (or primary) users (PUs)'s using spectrum sensing and classification, as the secondary users (SUs) of a CRN are not supposed to interfere with the PUs' communications.

In certain implementations, spectrum sensing schemes can be used to evaluate the signal features in the cyclostationary domain in CRNs. The cyclostationary (cyclic) feature detector can detect and classify the PU signals impaired by noise and interference with relatively high accuracy. However, general cyclic spectrum detector may require a high sampling rate and can impose a heavy computational load to the system. In some situations, compressive sensing (CS) can be used with the CR spectrum sensing in order to reduce the computational load by using a low sub-Nyquist sampling rate to collect the compressed measurements. However, CS methods still have a high computation overload due to their complicated signal recovery algorithms.

The presently disclosed systems and methods for detecting unused communication spectrum are directed to overcoming one or more of the problems set forth above and/or other problems in the art.

SUMMARY

The systems and methods described in the present disclosure involve exploiting CS in a specific sparse domain (i.e., cyclic domain) and also utilize a cyclostationary feature based compressive spectrum sensing scheme to perform the spectrum analysis. In the sensing front end, the compressive measurement matrix is generated based on the cyclostationary feature and sparsity prior knowledge. Compressive signal processing (CSP) is used for spectrum sensing and pattern analysis without complicated signal reconstruction.

Further described herein is the application of SVM (support vector machine, an artificial intelligence method) to classify the cyclostationary features in CSP to better recognize the spectrum patterns. Traditionally, a measurement matrix is designed via information theory to maximize the mutual information between the dynamic signals. However, such a matrix generation may be hard to implement and needs to have specific methods depending on different stochastic signals. Here, the cyclostationary features are applied as the prior knowledge and its sparsity nature are used to perform sub-Nyquist spectrum sampling at the front end for the sampling measurement matrix design. This not only reduces the complexity of computation but also increases the spectrum pattern recognition performance during the CSP procedure. Exemplary results show that it provides robust spectrum detection under noisy conditions, and can well classify typical modulated PU signals. The compressive ratio is much higher than traditional reconstruction-based compressive spectrum sensing (CSS) methods. CSP performance such as spectrum detection accuracy and robustness to the noise uncertainty is significantly improved when the sampling matrix is designed under the cyclic frequency domain, in which the signals are much sparser and better featured than the time or frequency domains.

Also described herein is the adaptive adjustment of system parameters (i.e. bandwidth, measurement size, etc.) of the described CSP methods to find a good performance balance point between the performance and the complexity. This allows the spectrum sensing to no longer be a static process any more. It can self-adjust its operations based on the complex radio environment. The present disclosure involves the use of a CSP measurement-distance adaptive spectrum detector to dynamically adjust the spectrum sensing matrix in the filter banks according to the feedbacks. By applying the presently disclosed spectrum sensing method, the detection accuracy and robustness may be increased, and the energy consumption and computational complexity may be reduced.

According to one non-limiting aspect of the disclosure, a method for cognitive radio spectrum sensing of a signal is disclosed. The method can include applying a pre-defined cyclostationary feature to detect the presence of the signal; detecting the signal; detecting a spectrum associated with the signal; sampling randomly the detected signal from its cyclic frequency domain; and applying a compressive sensing algorithm to classify the signal based on the cyclostationary feature. In one implementation, the signal can be sparse in time, space, frequency, or code domains. In one implementation, the cyclostationary feature can depend on a carrier frequency of the signal and a symbol rate of the signal. The cyclic frequency domain can include a frequency of the signal and a cycle frequency of the signal. Computing a spectrum correlation function of the signal may be performed as a part of the application of the pre-defined cyclostationary feature. The compressive sensing algorithm can include determining a measurement matrix in a sparse domain of the signal. Furthermore, the measurement matrix can satisfy a restricted isometry property. Detecting the signal may be based on performing a statistical estimator on the signal. The statistical estimator can be, for example, a Neyman-Pearson or a Bayesian estimator. System parameters including a bandwidth and a measurement size can be adaptively adjusted based on the spectrum of the signal.

According to another one non-limiting aspect of the disclosure, a system for cognitive radio spectrum sensing of a signal is disclosed. The system can include a detector including a processor that can apply a pre-defined cyclostationary feature to detect the presence of the signal and a spectrum associated with the signal. The processor can sample randomly the detected signal from its cyclic frequency domain and can apply a compressive sensing algorithm to classify the signal based on the cyclostationary feature. In one implementation, the signal can be sparse in time, space, frequency, or code domains. The cyclostationary feature can depend on a carrier frequency of the signal and a symbol rate of the signal. The cyclic frequency domain can include a frequency of the signal and a cycle frequency of the signal. Computing a spectrum correlation function of the signal may be performed as a part of the application of the pre-defined cyclostationary feature. The compressive sensing algorithm can include determining a measurement matrix in a sparse domain of the signal. Furthermore, the measurement matrix can satisfy a restricted isometry property. Detecting the signal may be based on performing a statistical estimator on the signal. The statistical estimator can be a Neyman-Pearson or a Bayesian estimator. System parameters including a bandwidth and a measurement size can be adaptively adjusted based on the spectrum of the signal.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
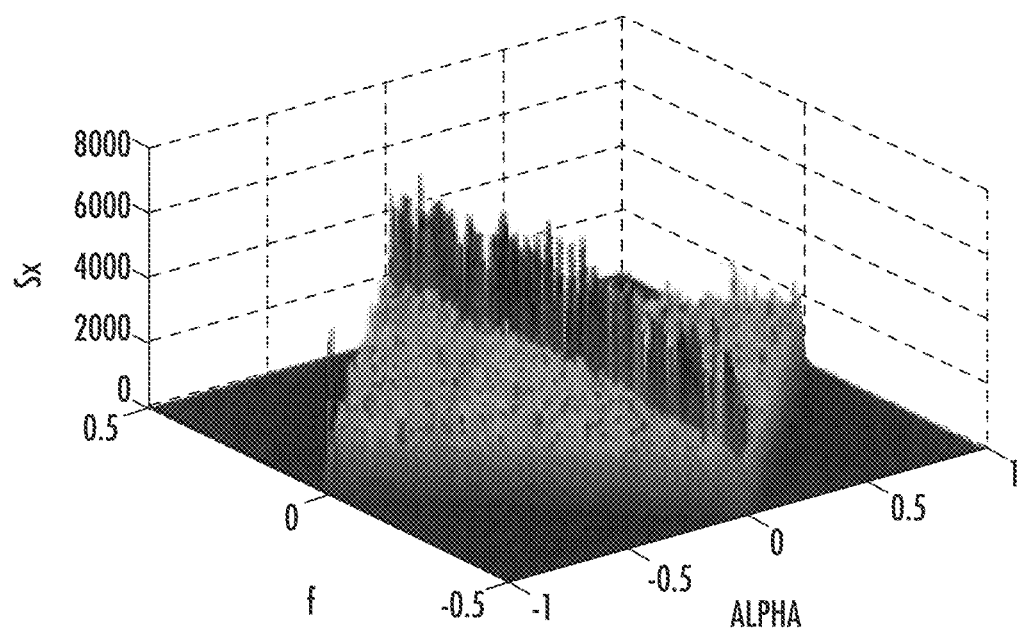
FIG. 1 shows spectrum correlation function for modulation of signals under noise.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

1 System Model

Aspects of the disclosure are directed to detecting and classifying a primary user's (PUs') modulated signals via efficient spectrum sensing and analysis schemes. When cyclostaionary features are used, the peak value patterns under the 2-D cyclic frequency domain are specific for different modulation signals. The patterns depend on the carrier frequency and symbol rate. Such pattern can be extracted by an organized CS and processed via the CSP scheme to fulfill the PU signal detection or classification. The PU signals detected in CR users can be defined as $$y[n] = P(nT)s(nT)\cos(2\pi f_c t + \theta) + w[nt] \qquad (1)$$

where P is the pulse shape filter, s(nT) is the symbol signals which has all the information to be modulated, $f_c$ is the carrier signal central frequency and w[nt] is the AWGN noise.

2.1 Cyclostationary Feature

The cylostationary domain can be used to analyze the features of the signals which are not stationary but that have periodical appearance in specific frequencies. Generally, it can be calculated by the Fourier transform of the autocorrelation of the non-stationary signals at real frequencies. Cyclostationary signals will have the property as $$m_s(t) = m_s\left(t + \frac{k}{\alpha}\right) \qquad (2)$$
$$= E[s(t)] \ (k = 1, 2, \ldots, N)$$

where E is the expectation and estimation of the signal mean, α is the cycle frequency. The signal autocorrelation is $$R_s\left(t + \frac{\tau}{2}, t - \frac{\tau}{2}\right) = R_s\left(t - \frac{k}{\alpha} + \frac{\tau}{2}, t + \frac{k}{\alpha} - \frac{\tau}{2}\right) \qquad (3)$$

The dual frequencies, real and cyclic frequency, on the 2-D cyclic domain are calculated by a double Fourier transform. They are the autocorrelations in time t and delay τ as in (4)-(8).

$$R(t, \tau) = E\left\{x\left(t + T + \frac{\tau}{2}\right)x^*\left(t + T - \frac{\tau}{2}\right)\right\} \qquad (4)$$

$$S_s(t, f) = \int E\left\{x\left(t + T + \frac{\tau}{2}\right)x^*\left(t + T - \frac{\tau}{2}\right)\right\}e^{-j2\pi f\tau}d\tau \qquad (5)$$

$$= \int R_s\left(t + T + \frac{\tau}{2}, R_s\left(t + T - \frac{\tau}{2}\right)e^{-j2\pi f\tau}d\tau$$

$$R_s(\alpha, \tau) = \int x\left(t + \frac{\tau}{2}\right)x^*\left(t - \frac{\tau}{2}\right)e^{-j2\pi\alpha t}dt \qquad (6)$$

$$S_s(\alpha, \tau) = \int R_s(t, \tau)e^{-j2\pi\alpha t}dt \qquad (7)$$

$$S_s(\alpha, f) = \int R_s(\alpha, \tau)e^{-j2\pi\alpha\tau}d\tau \qquad (8)$$

The cyclic feature is extracted for a referred frequency via equations (4), (6). And (8) is the SCF (spectrum correlation function). As described herein, this is the feature applied to CSP for the PU detection or classification. It is robust to the noisy environment since such a feature can often be easily captured even under noise (see, for example, FIG. 1).

As shown in FIG. 1, the SCF of modulation signals has certain peak value pattern and overcomes the effects of noise. Because this type of feature is the second-order statistic of the sampled signal s(t), it is usually obtained by calculating the frequency information on the first-order time sampled modulation signals. The second-order statistical format is the Fourier transformation of the real frequency autocorrelation. Therefore this cyclic frequency feature can be used to detect or differentiate the modulation signals from the noise or interference.

Table I, below, shows the SCF peak value patterns of exemplary different modulation signals. For the white noise or interference case, the SCF value is all about zero except α=0. But the SCFs of BPSK, QPSK, ASK modulation signals are all distinguishable from each other. What's more, the features in cyclic domain are also sparse even for the wideband spread signals.

TABLE I

CYCLOSTATIONARY FEATURE
OF MODULATION SIGNALS

| Modulation | S(a, f) Peaks |
|---|---|
| BPSK | (1/T, $f_c$), (2$f_c$, 0), (2$f_c$ ± 1/T, 0) |
| QPSK | (1/T, $f_c$), (2$f_c$ ± 1/T, 0) |
| MSK | (1/T, $f_c$) |
| ASK | (2$f_c$, 0) |
| AWGN | (±∞, ±∞) |

$f_c$ is the carrier frequency, a is the cyclic frequency, T is the symbol period.

In summary, the cyclostationary feature has the following features: It is robust to the interference and noise in low-SNR environments; It is in a very sparse cyclic domain, which makes it essentially suitable to apply CS; and It has a clear pattern for different modulation signals, thus it is easy to detect and classify the CSP measurement.

Even thought there are many benefits when applying cyclostationary features, one drawback may be the implementation. As described previously, a cycloststionary detector first uses the time domain spectral autocorrelation function to analyze the cyclic features in signal s(t). And it needs to estimate the ideal spectral autocorrelation function via the strip spectrum correlation algorithm (SSCA), which is an FFT-based time smoothing algorithm. A simplified implementation can be described as $$\tilde{S}_s(\alpha, f) = \frac{1}{NM} \sum_{k=1}^{M} X_k\left(f - \frac{\alpha}{2}\right) X_k^*\left(f + \frac{\alpha}{2}\right) \quad (9)$$

where X is the FFT of the sampling signal s(n), M is the spectrum correlation size, and the N is the FFT size.

Figure 2:
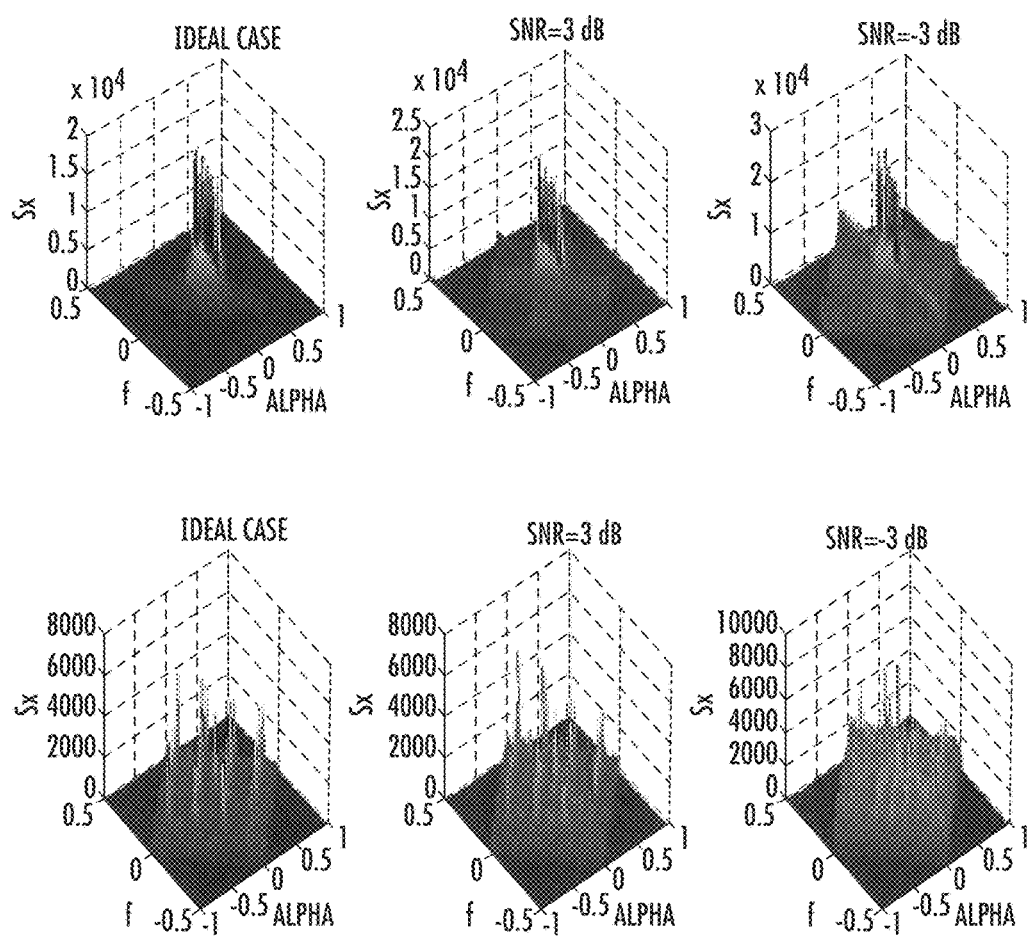
FIG. 2 shows BPSK, QPSK signals in the cyclic frequency domain and under noise.

FIG. 2 illustrates exemplary implemented BPSK (first row of FIG. 2) and QPSK (second row of FIG. 2) signals cyclic features under different SNR level. The cyclic features in the second-order statistics are considered as the spectral frequency on Loeve transform, and are useful for the spectrum detection and classification. The data of FIG. 2 is adapted from the DTV database, where certain interference has been added. As shown in FIG. 2, the cyclostaionary features of the signals can be easily recognized even under a very low SNR (−3 dB).

In this case, compared with the energy detector, it has double FFT and sum calculations when extracting the SCF features in cyclic frequency 2-D domain. Especially for the wide band sensing, the SU will have a heavy burden with a high energy consumption as well. According to the Nyquist theory, the sampling frequency needs to follow:

$$f_s > 2f_{max}$$

In previous systems and methods, the requirement of a high-rate sampler in ADC may make it challenging for the hardware design. In the CSP-based approach described herein, the complexity of cyclic feature detection is reduced and the energy is saved significantly due to the low sampling rate.

1.2 Compressive Sensing Framework

Compressive Sensing (CS) is known in the signal processing community, and is efficient for the sparse signal compression in the sensing step compared to the traditional Shannon-Nyquist sampling theorem. Other than using the Nyquist sampling, which needs the sampling rate of more than double the highest frequency component in the signal, CS uses much lower sampling rate by randomly collecting the samples from the entire sparse signal domain. Then, the currently-known optimal method is used to iteratively reconstruct the original signal with little data loss.

Figure 3:
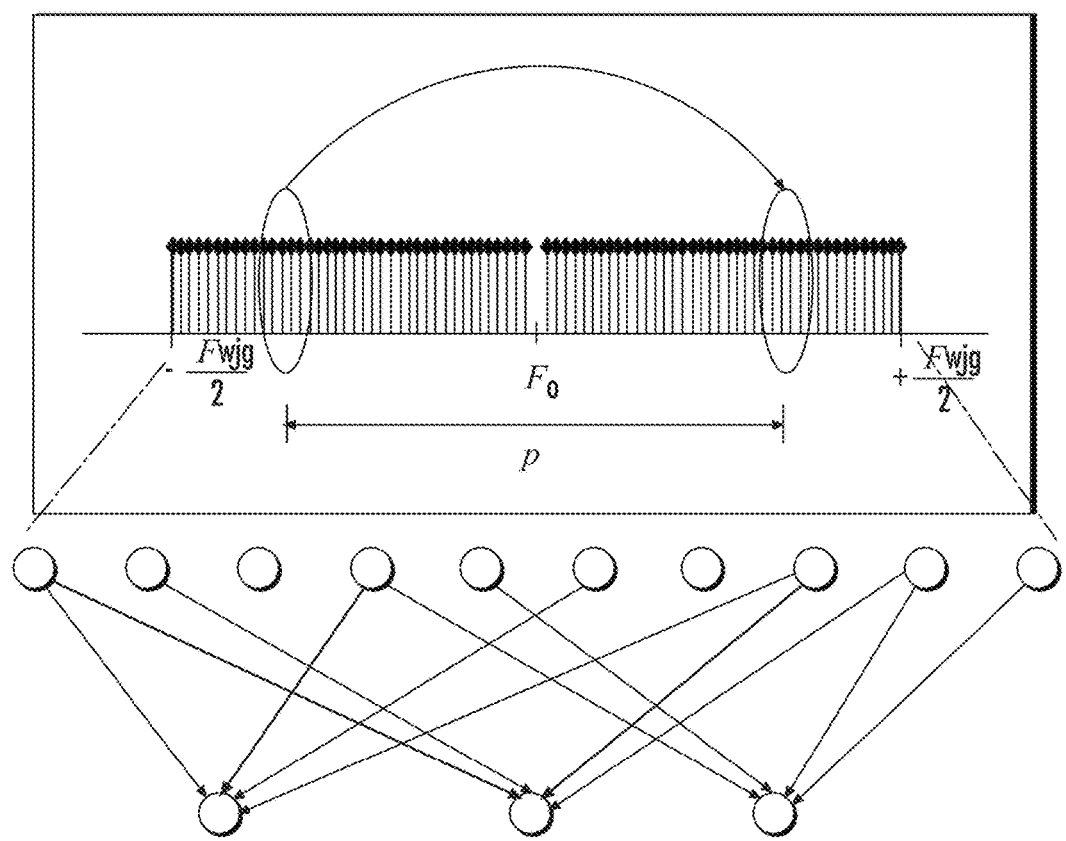
FIG. 3 shows a linear combination of n-dimensional signals to produce the p-dimensional measurement.

As shown in FIG. 3, the compressed signal is a random linear combination of the sensed original signals. In embodiments of the methods and systems described herein, information is directly sampled from the cyclic domain without time-consuming signal reconstruction while reserving the important signature features for different types of modulated signals.

Compressive Sensing can be applied when the PU signals are sparse in time or other different domains in order to reduce the measurement size. It samples the signals at a sub-Nyquist rate. However, it is challenging to design the measurement matrix and choose a fast signal reconstruction algorithm in CS applications. Described herein are embodiments of systems and methods that focus on the measurement matrix design and apply the compressive signal processing (CSP) for PU detection without the challenges of reconstruction.

Figure 4:
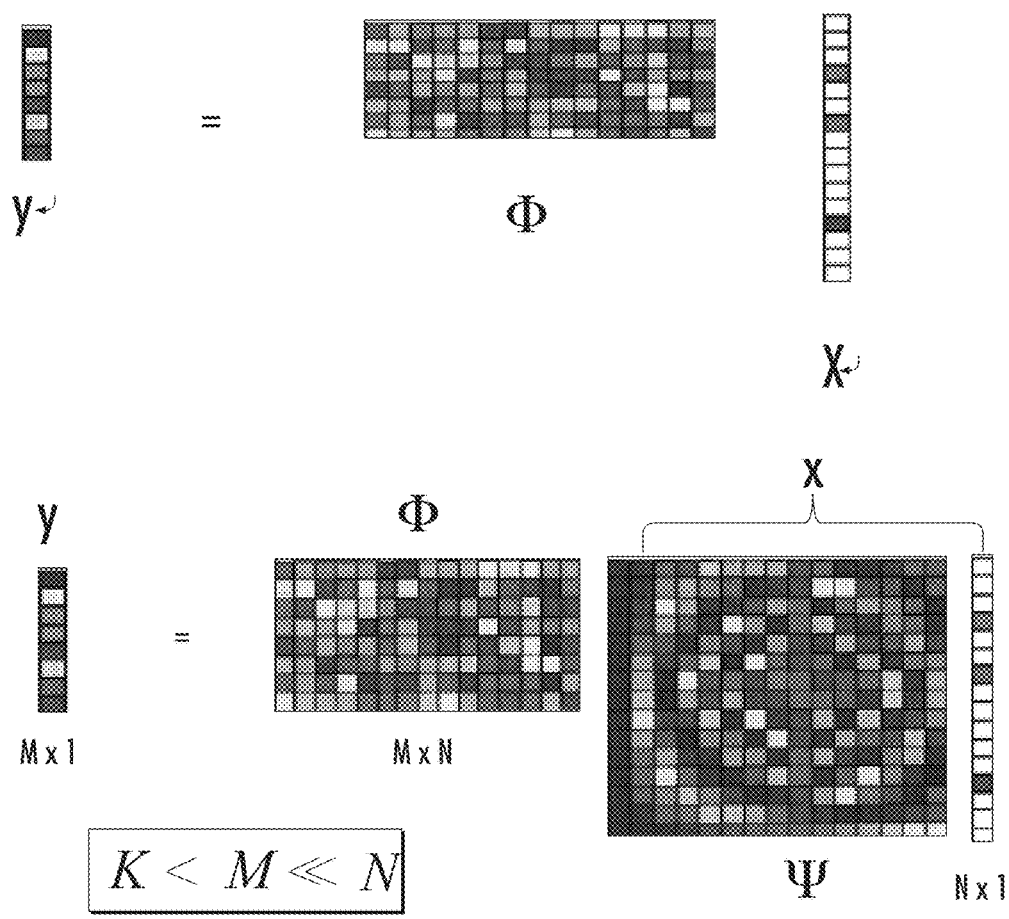
FIG. 4 shows a compressive sensing measurement in different domains.

The measurement matrix is an important challenges when using CS. It ensures that enough useful information is collected for the applications and also compress the measurements in a high ratio. As shown in FIG. 4, the design of the measurement matrix may be different in different signal sparse domains to obtain the needed compressed measurement.

It can be stated that a matrix φ satisfies the RIP (restricted isometry property) of order K if there exists a constant δ(0,1), such that $$(1-\delta)\|x\|_2^2 \le \|\varphi x\|_2^2 \le (1+\delta)\|x\|_2^2 \quad (10)$$

Also, the RIP ensures that any compressible signal from the CS measurements can be recovered by the convex optimal algorithms. Based on the RIP, random collection can be used in the cycle frequency domain to extract the cyclostationary SCF features. As described before, they are sparser and easier to apply CSP detector than other measurements commonly used in time or frequency domains.

Figure 5:
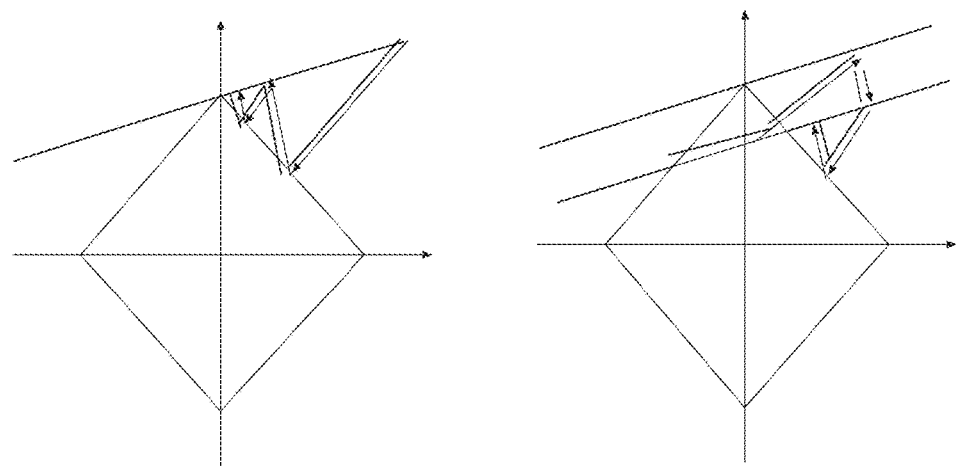
FIG. 5 shows an L1 norm algorithm on compressive sensing geometry illustration.

Another issue to consider in CS is the signal reconstruction algorithm that aims to estimate the original uncompressed signals. In the traditional Nyquist sampling the signal reconstruction is easy since it has much more data samples than CS and can just use the sinc function to recover the original signals. It is a linear process that requires little computation. However, in the CS case, the recovery algorithm is more complicated due to its non-completed random sampling nature. The reconstruction is a nonlinear optimization process. The CS reconstruction algorithms usually use greedy or L1 norm method to iteratively find the solution (FIG. 5). This involves high computation overload. As shown in the left side of FIG. 5, the final solution is expected to converge to the original signal. But, as shown in the right side of FIG. 5, when there is noise or interference other constrains need to be added in the objective equation, which will make the algorithm more complex and more difficult to converge. Lines of convergence are shown with double lines.

When applying the CS to the CRN for channel estimation and spectrum sensing, two issues must be considered. One is the sensing design and the other one is the computation burden for the system. In the following, the signal detection principle is explained when using CS in spectrum sensing of CRN.

The basic detection theory is from the statistical estimator detections, which could be, for example, a Neyman-Pearson (NP) estimator or a Bayesian estimator. Both can be implemented by the form of likelihood ratio.

$$H_0: y[n] = w[n], n = 1, \ldots, N \quad (11)$$

$$H_1: y[n] = x[n] + w[n], n = 1, \ldots, N \quad (12)$$

$$\Lambda(y) = \frac{p(y \mid H_0)}{p(y \mid H_1)} \quad (13)$$

Normally, the energy detector can be used in the white noise and non-fading environment. It just needs to compare the power levels of the signal and noise. For example, the following can be used:

$$\Lambda(y) = \frac{\|y\|^2}{\delta^2} \overset{H_1}{\underset{}{>}} \eta \quad (14)$$

or $$\Lambda(y) = \frac{\|y\|^2}{\delta^2} \underset{H_0}{<} \eta$$

where $\eta$ is the threshold for energy detector and is easy to fulfill and apply. However, when there is fading or interference to PU signals, it can be shown that the SNR wall will be the main bottleneck for energy detection. The feature detection is more useful in these situations. The features are extracted from the PU signals based on the stationary frequency correlation relationships. Usually the second-order statistical features are efficient and the cyclostationary domain is proposed that has the frequency property of the cyclic autocorrelation of PU signals. It can be shown that the more prior knowledge of the PU signal is available, the better spectrum detection performance can be achieved. The complexity, sensing time and energy consumption need to be considered for practical implementation. Therefore, the cyclostationary features are added as another consideration in order to achieving more accurate detection results. The modulation signals for spectrum pattern analysis can be classified as:

$$\Lambda(y) = \operatorname{argmax} \frac{\|y - v_i\|^2}{\|y - v_0\|^2} \overset{H_1}{\underset{}{>}} \eta \quad (15)$$

or $$\Lambda(y) = \operatorname{argmax} \frac{\|y - v_i\|^2}{\|y - v_0\|^2} \underset{H_0}{<} \eta (i = 1, 2, \ldots, k)$$

where $v_i$ is the trained central vector beforehand when PU's parameters are known for SUs.

Figure 6:
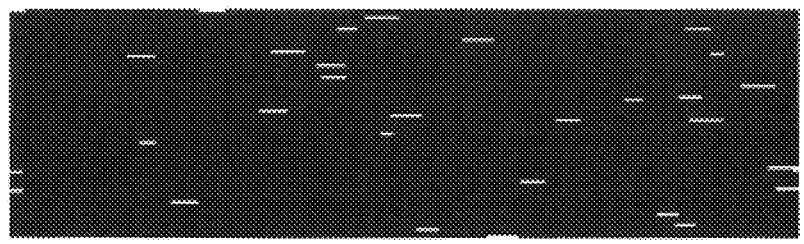
FIG. 6 shows a sparse PU pattern with n=100 and an efficiency of 0.01. The Gaussian distribution on-off PU pattern is shown as well.

Assuming that there are n channels, which are sparsely used by the PUs. Two PU traffic models are often used. One is the On-Off model, and the other is the Poisson distribution model. In one exemplary application, the On-Off model can be used with a Gaussian distribution. An example of the PU signals is shown in FIG. 6. To obtain the sparse feature of the measurement, it can be assumed that the PU utilization efficiency is less than approximately 0.05, which is typical in under-utilized CR networks. To detect the different modulation signals, QPSK, BPSK, ASK signals transmitted in different channels were set up with such a PU traffic model.

FIG. 6 shows a Gaussian distribution on-off sparse PU pattern with n=100 and an efficiency of approximately 0.01. Here n is the total number of channels. White space is occupied by PU signals. Compressive sensing achieves good compression performance through the prior knowledge of the sparsity of the original signal in certain domains. To make the vectors in cyclic frequency domain sparser, a threshold is set up to better extract the cyclic features. CS can be used to compress the spectrum with nonlinear combinations in order to extract the cyclic measurements.

2. Compressive Measurement Matrix Design and Compressed Signal Processing

As described herein, one task in CSS is to design the measurement matrix, which collects compressed signal measurements and fulfills the robust detection. Based on the matrix transformation theory, a second-order measurement matrix can be designed. In the design described herein, not only are the PU signals robustly detected under the colored noisy environment, but also classified the different types of modulation signals including the wide spectrum signals (e.g., CDMA and OFDM signals).

In traditional CS strategies, the original signal is collected randomly in the noise basis. This can obtain enough information when the signal is sparse in time or other classical domains. From the low rank noise basis as well as the sparse transfer domain knowledge, the original signals can be reconstructed by iterative optimization methods such as MP, OMP, SSLOP convex projections, and the like. In CR systems, short sensing time and low energy consumption in each SU are important for the implementation. Described herein; however, are embodiments of systems and methods of using such a CSP theory for CR compressive spectrum sensing wherein its performance limit in terms of the classification capability in the compressed signal space can be overcome.

2.1 Cyclostationary Measurement Matrix

The structured CS measurement matrix can be used for the cyclic feature extraction. Based on it, the nonlinear combination of the low-rate samples will hold the structure of the modulation signals in the cyclic domain. Therefore, the described CSP methods can easily detect or classify PU signals. A time-random, compressive sampling process can be written as:

$$z_t = A x_t \quad (16)$$

The cycle feature, $s_x^c$, can be reconstructed from time compressive samples for further idle spectrum detection and channel occupancy decision. The autocorrelation for the cyclic feature can be calculated in the covariance format. The time varying covariance over m frames can be expressed as:

$$r_s(n, v) = E\{x(nT_s)x^*(nT_s + vT_s)\} \quad (17)$$

$$= E\{x[n]x^*[n+v]\}$$

$$= \frac{1}{m}\sum_{\gamma=1}^{m} x_\gamma x_\gamma^T$$

And the cyclic frequency of the correlation covariance can be implemented as:

$$\hat{r}_s(\alpha, v) = \left\{\frac{1}{N}\sum_{n=0}^{N-1-v} r_s(n, v)e^{-\frac{j2\pi}{N}\alpha n}\right\}e^{-\frac{j\pi}{N}\alpha v} \quad (18)$$

where $\alpha$ is the cycle frequency and v is the delay lag in the cross-correlation. The correlation covariance matrix is shown in equation (19):

$$R_s = \begin{bmatrix} r_s(0,0) & r_s(0,1) & \cdots & r_s(0,N-1) \\ r_s(0,1) & r_s(1,0) & \cdots & r_s(1,N-2) \\ r_s(0,2) & r_s(1,1) & \cdots & r_s(2,N-3) \\ \vdots & \vdots & \ddots & \vdots \\ r_s(0,N-1) & \cdots & \cdots & r_s(N-1,0) \end{bmatrix} \quad (19)$$

The relationship between them is as follows:

$$r_x = Q_N vec\{R_x\} \quad (20)$$

Where $Q_N$ is the $$\{0,1\}^{\frac{N(N+1)}{2}}$$

mapping matrix. From the transform of the compressed samples' covariance matrix the cyclic station features can be reconstructed via the optimal objective function:

$$R_s^c = \sum_{v=0}^{N-1} G_v R D_v \quad (21)$$

where, $$G_v = \frac{1}{\sqrt{\frac{1}{2}(N(N+1))}} e^{-\frac{j2\pi}{N}\alpha\left(n+\frac{v}{2}\right)}$$

and W in (22) is the Vandermonde matrix for the roots of unity.

$$W = \frac{1}{\sqrt{N}}\begin{bmatrix} 1 & 1 & \cdots & 1 \\ 1 & \omega & \cdots & \omega^{(N-1)} \\ 1 & \omega^2 & \cdots & \omega^{2(N-1)} \\ \vdots & \vdots & \ddots & \vdots \\ 1 & \omega^{(N-1)} & \cdots & \omega^{(N-1)(N-1)} \end{bmatrix} \quad (22)$$

Vectorized $r_s$ will be $$vec\{R_s^c\} = \sum_{v=0}^{N-1}(D_v^T \otimes G_v)vec\{R\} = Hr_s \quad (23)$$

Vectorized $s_s^c$ will be $$S_s^c = vec\{R_s^c F\} \quad (24)$$

$$= (I \otimes F)\sum_{v=0}^{N-1}(D_v^T \otimes G_v)vec\{R\} = Tr_s$$

where I is the unity matrix and the F is the N×N point FFT. The relationship of $r_s$ and $s_s^c$ is $$r_s = H^+ W S_s^c \quad (25)$$

The cycle frequency can be determined by the matrix transform as $$L = \sum_\tau e^{-j2\pi f\tau}\sum_t e^{-j2\pi\alpha t} \quad (26)$$

$$\begin{bmatrix} x[1] & \cdots & x[n-1] \\ \vdots & \ddots & \vdots \\ x[n] & \cdots & x[1] \end{bmatrix} \otimes \begin{bmatrix} x[n] \\ x[n-1] \\ \cdots \\ x[n-\tau] \\ \cdots \\ x[n-(n-1)] \end{bmatrix}$$

where L is the covariance transform matrix, a $\{1,0\}^{N\times N}$ permutation matrix. Therefore:

$$r_s = L \cdot x_t \quad (27)$$

From the transform of the compressed samples' covariance matrix the cyclic station features can be reconstructed by the optimal objective equation as:

$$\min_{s_{xs}^C} \|r_s - \Psi s_{xs}^C\|_2^2 + \lambda\|s_{xs}^C\|_1 \quad (28)$$

Here, $r_z$ is applied because it can be implemented by just calculating the covariance matrix of $z_t$. It is actually using the prior knowledge of sparse cyclostationary features of the original signals for reconstruction. In the embodiments described herein, the cyclostationary feature can be added into the front end sampling step as well. Therefore, there may be no need to reconstruct the CSP from the random linearly combined samples in the cyclic frequency domain. The new measurement matrix can then be designed as:

$$z_t' = \varphi\psi_{sc}^{-1}s_{xs}^C = \varphi L T s_{xs}^C \quad (29)$$

where $\varphi$ is the random noise sampling matrix built by the PN coding, Benoulli coding and multi-channel linear combination shown as in equation (30):

$$\Phi = \begin{bmatrix} 1 & 1 & 1 & \cdots & 0 \\ 0 & 1 & 1 & 1 & \\ & & \cdots & & \\ 0 & \cdots & 1 & 1 & 1 \end{bmatrix}_{M\times(KN)} \quad (30)$$

-continued $$\begin{bmatrix} 1 & -1 & \cdots & 1 & 1 \\ -1 & 1 & \cdots & 1 & -1 \\ & & \cdots & & \\ 1 & 1 & \cdots & -1 & -1 \end{bmatrix}_{(KN)\times(PN)}$$

$$\begin{bmatrix} 1 & 0 & 1 & \cdots & 0 \\ 0 & 1 & 0 & 1 & \\ & & \cdots & & \\ 0 & \cdots & 1 & 0 & 1 \end{bmatrix} \cdots$$

$$\begin{bmatrix} w_1 I_{N\times N} & 0 & \cdots & 0 & 0 \\ 0 & w_2 I_{N\times N} & \cdots & 0 & 0 \\ & & \cdots & & \\ 0 & 0 & \cdots & 0 & w_P I_{N\times N} \end{bmatrix}_{(PN)\times N}$$

and the $\psi_{sc}^{-1}$ is the pseudo inverse of the transform equation matrix from the x(t) to $s_{xs}^C$ the cyclic frequency domain.

2.2 Compressed Measurement Processing

Because the CSP reserves the signal geometry structure in the compressive domain, it can be applied to the cyclostationary signal detection and classification. There are a few requirements in the design of the measurement matrix in the CSP applications. From the theorems in Y. Liu, H. Man and C. Comaniciu, "A Game Theoretic Approach to Efficient Mixed Strategies for Intrusion Detection," IEEE International Conference on Communications, 2006 Page(s):2201-2206, which is fully incorporated by reference and made a part hereof, it is known that after the Kth order of RIP measurement matrix construction, the original signal can be recovered with certain accuracy as:

$$\|\hat{x} - x\|_2 \le C_0 \varepsilon + C_1 \frac{\|x - x_K\|_1}{\sqrt{K}} \tag{31}$$

where for $\delta \in 0,1$, constants $C_0$, $C_1$ are:

$$C_0 = 4 \frac{\sqrt{1+\delta}}{1-(1+\sqrt{2})\delta} \tag{32}$$

$$C_1 = 2 \frac{1-(1-\sqrt{2})\delta}{1-(1+\sqrt{2})\delta} \tag{33}$$

Theorem 1: Suppose measurement matrix $\varphi$ satisfies the RIP of order 2K with isometry constant $\delta < \sqrt{2}-1$. Given measurements of the form y=$\varphi$x+e, the solution to $$\hat{x} = \mathrm{argmin}\|x'\| \text{subject to } \|\varphi x' - y\| \le \varepsilon \tag{34}$$

To obey this theorem, there needs to be $\delta$-stable embedding, which is the additional geometry requirement in the compressed domain for the CPS. A mapping $\varphi$ is a $\delta$-stable embedding of signals' spaces (U,V) if $$(1-\delta)\|u-v\|_2^2 \le \|\varphi u - \varphi v\|_2^2 \le (1+\delta)\|u-v\|_2^2 \tag{35}$$

The matrix $\varphi$, satisfying the RIP of order 2K, is equivalent to a $\delta$-stable embedding of ($\Sigma$2K,0). However, random matrix constructions is more than RIP in CS, so it can be assumed that the matrix is generated from the following design: Randomize M×N matrices $\varphi$ by choosing the entries as independent and identically distributed (i.i.d.) random variables. And the matrix should follow the requirements:

Norm-preserving $$E(\phi_{ij}^2) = \frac{1}{M} \tag{36}$$

Sub-Gaussian $$E(e^{\varphi ijt}) \le e^{c^2 t^2/2} \tag{37}$$

Concentration $$Pr(|\|\Phi x\|_2^2 - \|x\|_2^2| \ge \delta\|x\|_2^2) \le 2e^{-cM\delta^2} \tag{38}$$

Stable embeddings ensure the stability of the compressive classification, and control the error below a certain level when the measurement matrix is designed as above. From Lemma 1 and Lemma 2 below, the least M dimension measurement requirement can be determined.

Lemma 1: Let U and V be sets of points in $R^N$. Fix $\delta, \beta \in (0,1)$. Let $\varphi$ be and an M×N random matrix with i.i.d. entries chosen from a distribution satisfying concentration. If $$M \ge \frac{\ln(|u||v|) + \ln\left(\frac{2}{\beta}\right)}{c\delta^2} \tag{39}$$

then with probability exceeding 1–$\delta$, $\varphi$ is a $\delta$-stable embedding of (U,V).

Lemma 2: Suppose that $\chi$ is a K-dimensional subspace of $R_N$. Fix $\delta, \beta \in (0,1)$. Let $\varphi$ be an M×N random matrix with i.i.d. entries chosen from a distribution satisfying concentration. If $$M \ge 2 \frac{K\ln(42/\delta) + \ln(2/\beta)}{c\delta^2} \tag{40}$$

then with probability exceeding 1–$\delta$, $\varphi$ is a $\delta$-stable embedding of ($\chi,\{0\}$).

Random constructions can be used as a method to obtain stable embeddings. If the probability of classification error is fixed to be an acceptable constant $\beta$, then as M is increased, $\delta$ can be reduced to be arbitrarily close to $\varphi$. The deterministic guarantees that class of signals can be held by the CSP measurements when $\varphi$ provides a stable embedding.

The classification used here is defined as the CSP signal detector based on the hypotheses test to distinguish different modulation signals for Hypotheses:

$$\hat{H}_1: y = \varphi(s_i + n) \tag{41}$$

$$t_i = \min\|P_\varphi T X - P_\varphi T S_i\|_2^2 \tag{42}$$

The $P_\varphi T$ is the CSP detector and $t_i$ is the signal of $PU_i$. The classifier can equivalently be thought of as simply projecting each candidate signal onto the compressed space and then classifying signals according to the nearest neighbor in this space. The performance can be evaluated as a distance:

$$d = \min_{i,j} \sum_{k=0}^{n} \|s_{i,k} - s_{j,k}\|_2 \tag{43}$$

and it is denoted as the minimum separation among the $s_i$. Within the M-dimensional measurement subspace (as mapped to compressed dimension by $P_\varphi{}^T$) distances between points than the original signals will be compacted by a factor of approximately $\sqrt{M/N}$. As shown herein, the modulation signals' features in cyclic domain are much sparser than the time domain, which means they can hold longer distance between CSP measurements in the classification.

For the spectrum pattern analysis issue (after spectrum sensing is done), SVM or KNN classification can be used rather than reconstructing the original signal or its cyclostationary features. An uncertainty level for the classification can be set up in case the interference is in a high level. In the scheme described herein, different modulation signals with various cyclic patterns will be separated by embodiments of the described detector and classified, which is impossible for many other types of detectors. The classifier of the CSP method is defined as $$x_j = \arg\min_i(\|z_{new} - z_i\|)^2 \tag{44}$$

Because of the advantages of the cyclic feature and CSP detector, described herein are embodiments of a cyclostationary compressive measurement processing (CCMP) detector, which can be based on the cyclic-feature CSP detection schemes as described herein. Moreover, it can be an adaptive adjusted and feedback system. This implementation of the featured CS measurement matrix can be the practical way to find a good balance between the detection accuracy and the cyclic sensing rate.

Figure 7:
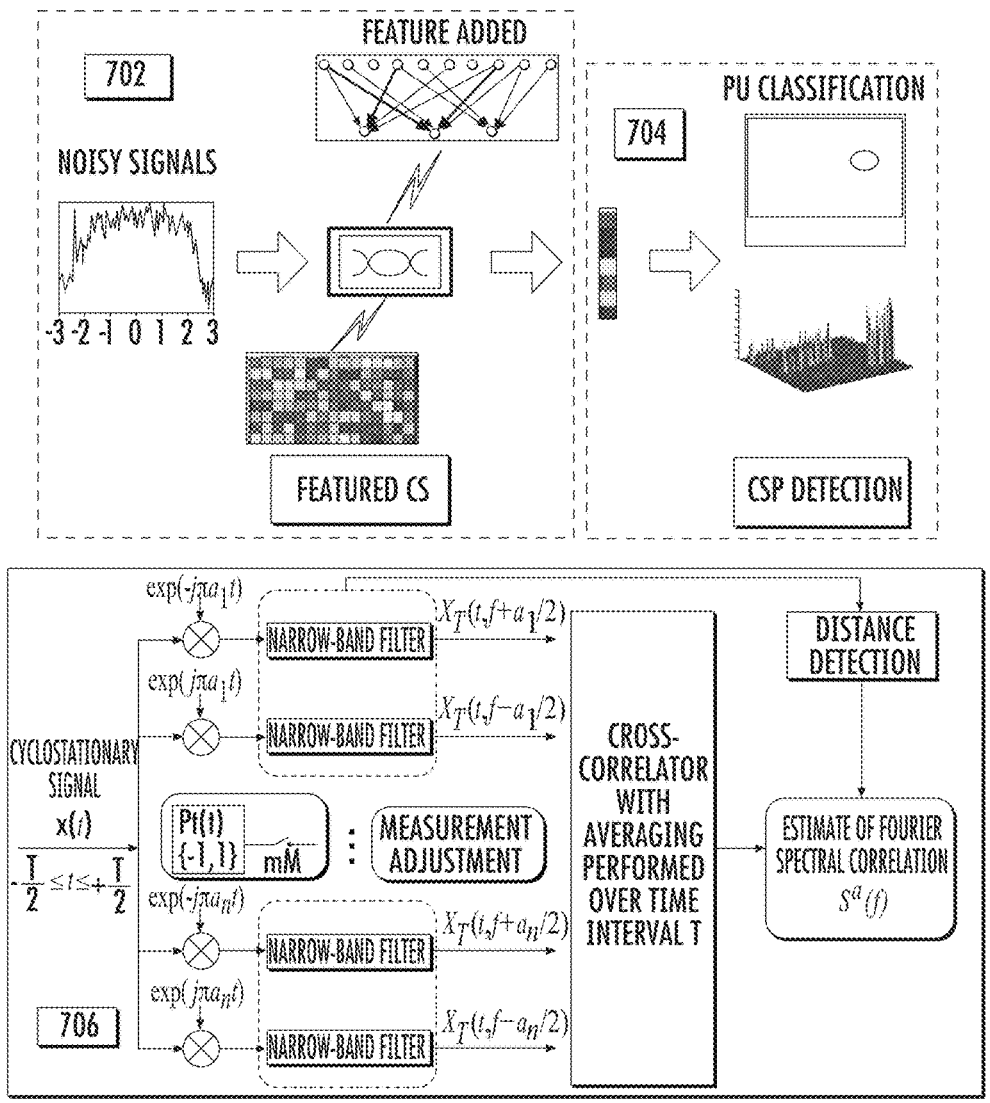
FIG. 7 shows a cyclostationary compressed measurement processing detector.

As shown in the FIG. 7, in one embodiment, the detector can be divided into two main parts. First 702, the cyclic feature is added into the CS random measurement and a sampling matrix is built as described herein. The sensing matrix can be implemented via the low rate sampling on the cyclic features, which can be calculated on the filter banks. CSP 704 can be then applied for further PU detection due to the specific cyclic features of modulated signals. Herein the cyclostationary correlation function is defined on the time smoothed cyclic cross periodogram:

$$S_x^\alpha(n, f)_{\Delta t} = \frac{1}{T}\left\langle X_T\left(n, f + \frac{\alpha}{2}\right)X_T^*\left(n, f - \frac{\alpha}{2}\right)\right\rangle_{\Delta T} \tag{45}$$

where the $X_T(n, f)$ is the complex demodulates which is implemented by $$X_T(n, f) = \sum_{r=-\frac{N}{2}}^{\frac{N}{2}} a(k)x(n-k)e^{-i2\pi f(n-r)T_s} \tag{46}$$

The SCF can be obtained by applying the conjugate multiplication and N-point FFT on the filter bank.

$$S_{X_T}^{f_k+q\Delta\alpha}\left(n, \frac{f_k}{2} - q\frac{\Delta\alpha}{2}\right)_{\Delta t} \tag{47}$$

$$= \sum_{r=1}^{N} X_T(r, f_k)x^*(r)g(n-r)e^{-i2\pi f(n-r)T_s}$$

where $f_k = k(F_s/N)$, $-N/2 \leq f_k \leq N/2 - 1$.

The least distance to the trained kernels is chosen and signals matched. Therefore, the PU, SU signals or interference can be detected or classified. In practical applications as in, for example, analog integrated chip (AIC) design, PN sequence and Bernoulli coding can be added to the sensing front end to lower the sampling rate. Adjustable filter banks can be used, which can separate the wide-band into different channels to allocate the PU's bandwidth. Depending on the distance, a guard distance can be set up. When the distance of the measurements gets close to each other, the sensing rate increases and the bandwidth from the filter bands can be reduced as shown in FIG. 7. Thus, in embodiments of the described system, the resolution of cyclic CS measurement can adaptively change in different environments and increase the accuracy of the detector.

More specifically, FIG. 7 shows a diagram of an exemplary embodiment of a cyclostationary spectrum detector 706 in accordance with aspects of this disclosure. A wide spectrum cyclostationary signal can be compressively sensed by the detector at the front end. This can be implemented by analog hardware. The sensing hardware can be designed based on the compressive noisy basis, and can sense the signal based on the disclosed compressive sensing theory. The signal can be also organized and filtered into the narrow-bands and the compressible signals in different parts of the wideband spectrum are obtained. After this the signal can be sampled at a much lower rate than a conventional ADC. It thus can have lower energy and cost. Meanwhile they can be coded with the designed PN coding and Bernoulli coding to obtain the compressed measurements. These compressed digital signals can be processed by FFTs to calculate the correlations between different spectrum signals to obtain the cyclostationary features in the compressive domain. These features can be analyzed by pattern recognition algorithms such as SVM, KNN, and the like. After the recognition and decisions are made, the compressive cyclic domain distances and errors can be computed and saved to memory for further analysis. When the error rate is beyond a pre-determined threshold, the sensing and coding measurement can be reconfigured to adapt to the environmental changes and achieve the optimal spectrum detection.

3. Numerical and Simulation Results

This section presents the numerical and Monte Carlo simulation results that illustrate the effectiveness of the proposed algorithms under noise uncertainty. The new detection scheme is also applied to a NS-2 CRN video system and implemented by the Universal Software Radio Peripheral (USRP) hardware for real wireless signal detection. The simulation results show that the system performance of embodiments of the described CSP detection method is much better than other traditional ones. The simulation parameters are listed in Table II, below. PU signals can be simulated with different modulation schemes in the 2.4 GHz frequency band. It is assumed that the wide band to be sensed can be equally divided into multiple channels, which can be suitable for the bank filter implementation and helps to achieve different adaptive

TABLE II

SIMULATION PARAMETERS

| System Parameter | Value |
| --- | --- |
| Sensing duration | 10.6 µs |
| Sensing frequency | 500*M/NHz |
| Number of samples | 5000*M/N in 10 s |
| Number of channels | 64 |
| Percentage of usage | <5% |
| Modulation Scheme | BPSK, QPSK, 16-QAM, . . . |

TABLE II-continued

SIMULATION PARAMETERS

| System Parameter | Value |
| --- | --- |
| Average SNR | −15:30 dB |
| Frequency | 0:2.4 GHz | measurement resolutions. This multi-channel system is similar to an OFDM system in that a various number of subcarrier channels and optimal modulation schemes are assigned to different users based on the channel quality. For this example, it can be also assumed that the environment can be in a suburban area and the licensed frequency bands can be idle with the usage of less than approximately 5%. The sensing time can be fixed, however the sensing rate changes in the adaptive adjustment system. The system can be set to test the performance of the detector under different SNR levels, from the good quality channels (30 dB) to really noisy conditions (−15 dB). Then, the detectors' robustness can be evaluated and compared to the noise and interference. The CCMP measurement matrix can be designed as described herein. The modulated signals can be sensed by different CS measurement matrices based on the desired compression rate. The simulation performances of the CCMP in detection and classification under different SNR levels and M/N compression rates can be explained. And it can be shown that the PUs signals can be accurately detected and even classified by different cyclic patterns. Both, simulation results and USRP-based hardware experiments are used to demonstrate the efficiency of embodiments of the CSP methods described herein.

Figure 8:
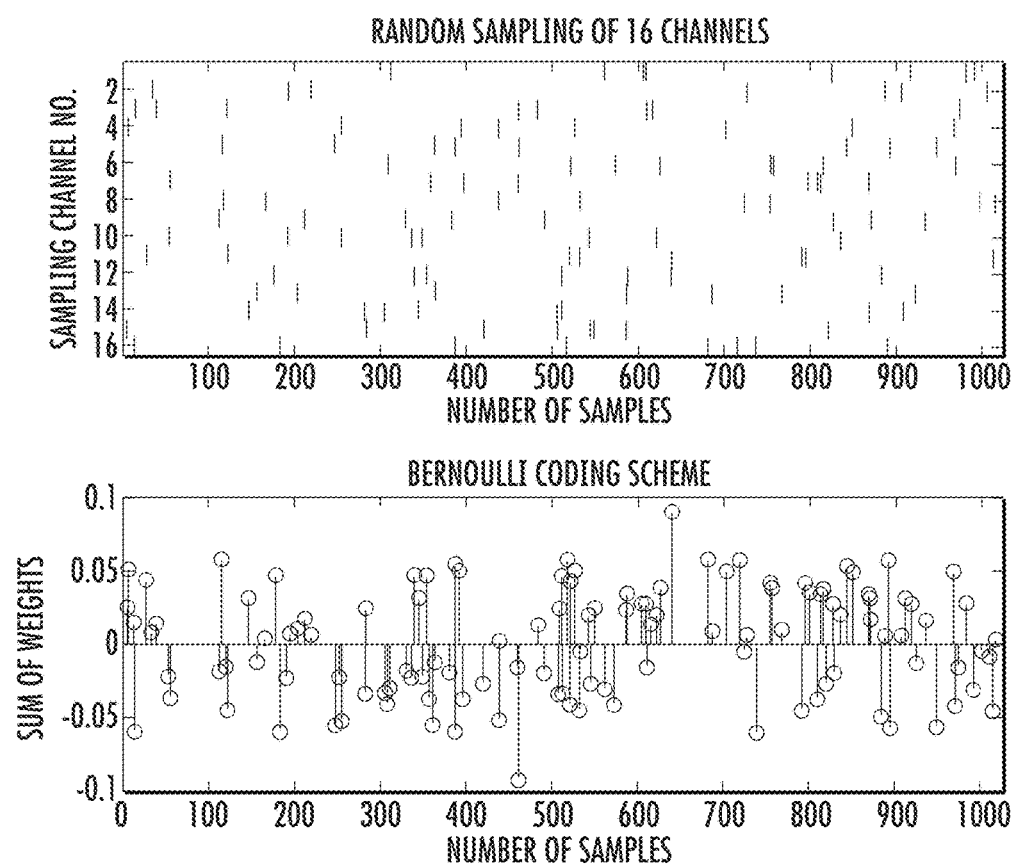
FIG. 8 shows a random coded sampling.

As illustrated in FIG. 8, multiple channels can be randomly selected and multiplied by the (1,−1) Bernoulli codes and PN weights. This design aims to randomize the collection of the sparse signal at a lower sampling rate and to build the PN measurement matrix as described above. After that, the sampling procedure can be further weighted by the cyclic features, which allows the collection of more cyclic information for building the compressed cyclic measurements. Both the random and cyclic prior knowledge helps obtain enough useful features in the measurement. Therefore, in the next step (CSP detection), a better CR performance can be achieved in the system.

Figure 9:
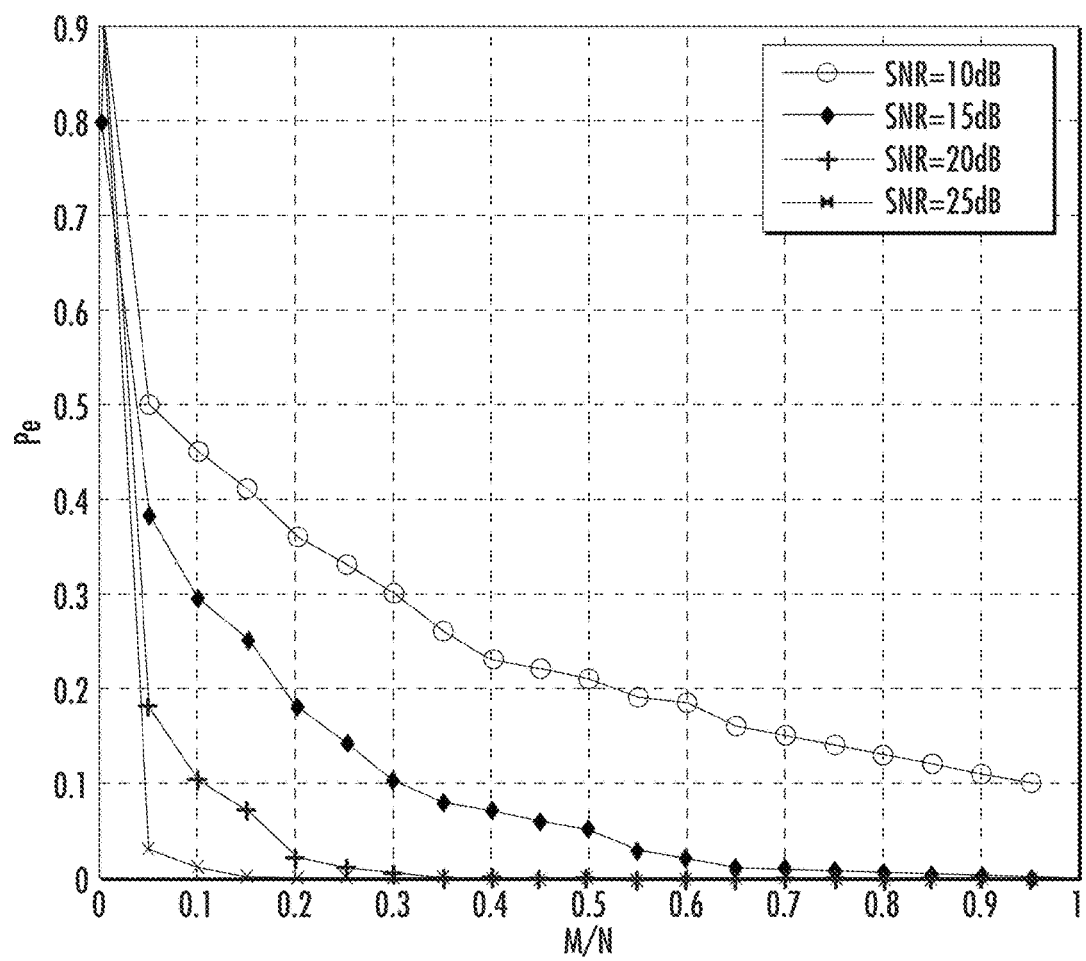
FIG. 9 shows compressed signal processing under different SNR levels.
Figure 10:
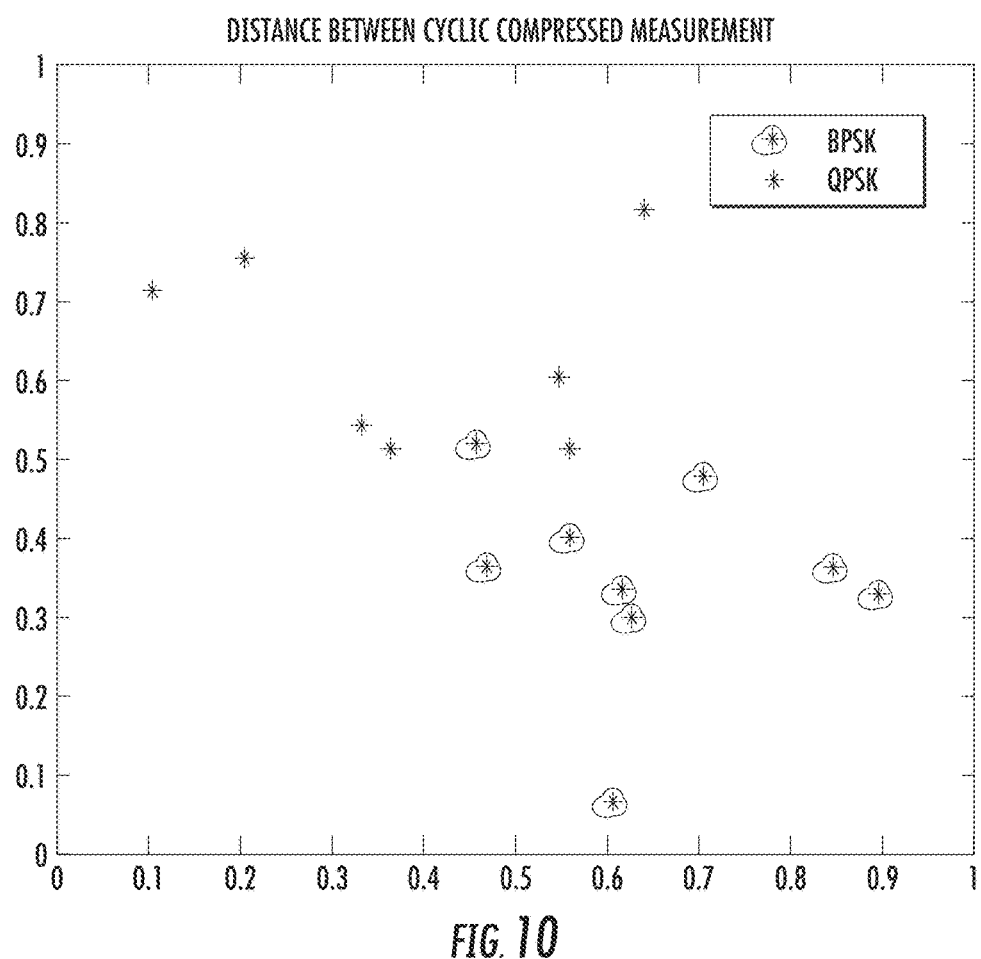
FIG. 10 shows pattern clustering in the compressive domain.
Figure 11:
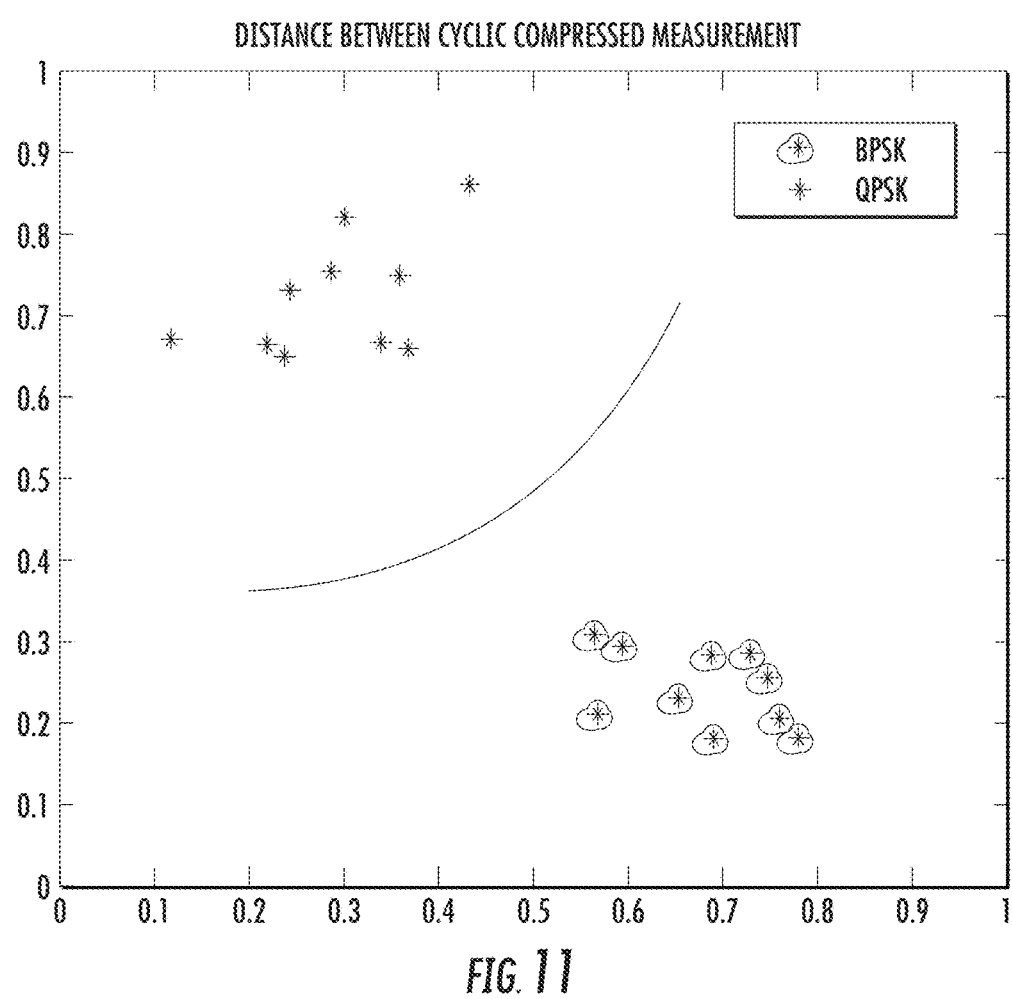
FIG. 11 shows pattern clustering in the cyclic compressive domain.
Figure 12:
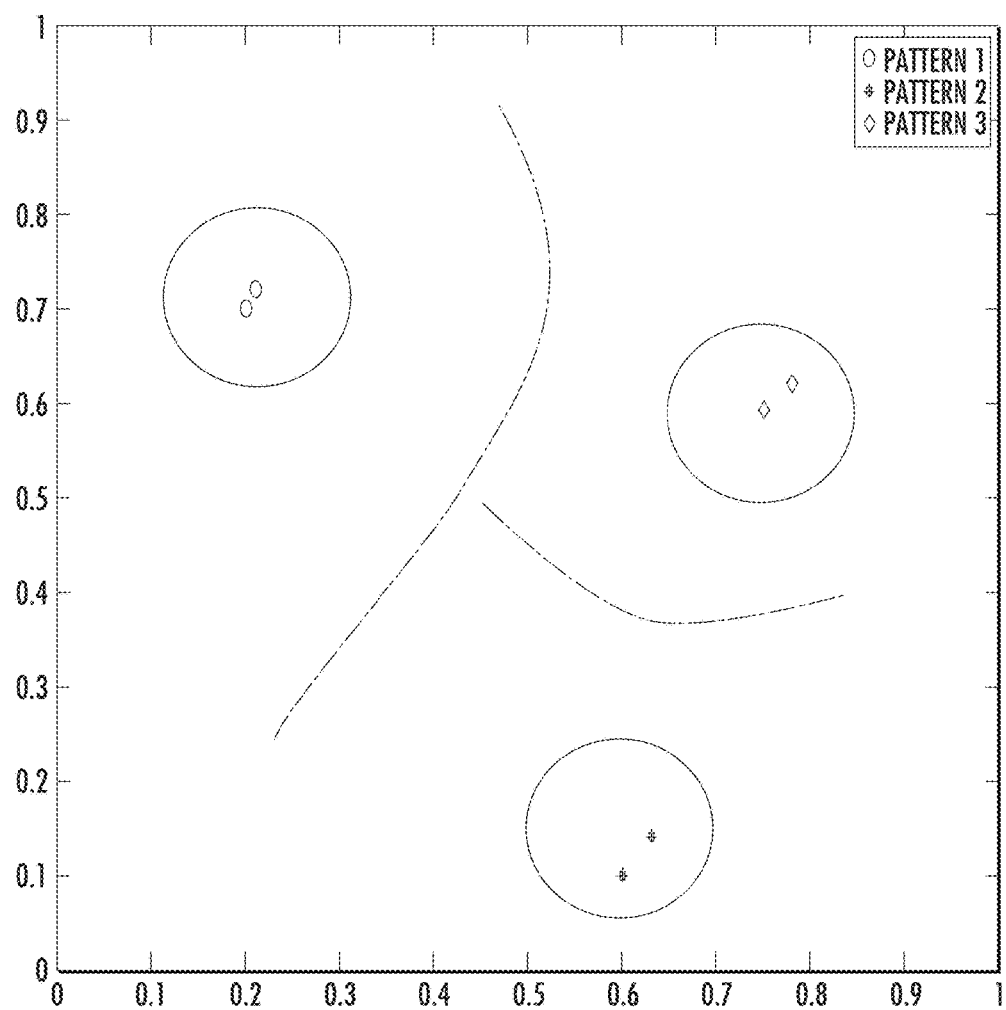
FIG. 12 shows multi-pattern clustering in the cyclic compressive domain.

Embodiments of the proposed CSP detector can be tested under different compressed rates and SNR levels with the purpose of analyzing the effects introduced by the sensing rate, detection accuracy and the robustness to the noise. As shown in FIG. 9, the detector detects the CSP measurements with a high accuracy in noisy channels. The compression ratio can be approximately 50% for the worst case with a low error probability, which also means half of the sensing energy is saved. When the SCF features are applied, the SNR levels have less effect on the detection probability, and the compression ratio can be about 10 dB higher than the regular CS. The benefits are obtained from the sparser features in the cyclic frequency domain and the CSP's non-reconstruction characteristics. As can be seen from FIG. 10, before adding the cyclic features, the CSP measurements can be sensitive to the noise and hard to be detected under the low SNR environment while in FIG. 11, the cyclic feature CSP measurements can be separated and detected well under the same condition. Since the cyclic feature can be also distinguishable for the different modulation signals, a further classification can be applied as shown in FIG. 12. By using the support vector machine (SVM) classifier, after a fine training, the CSP measurements can be clearly classified with different patterns in cyclic domain.

Figure 13:
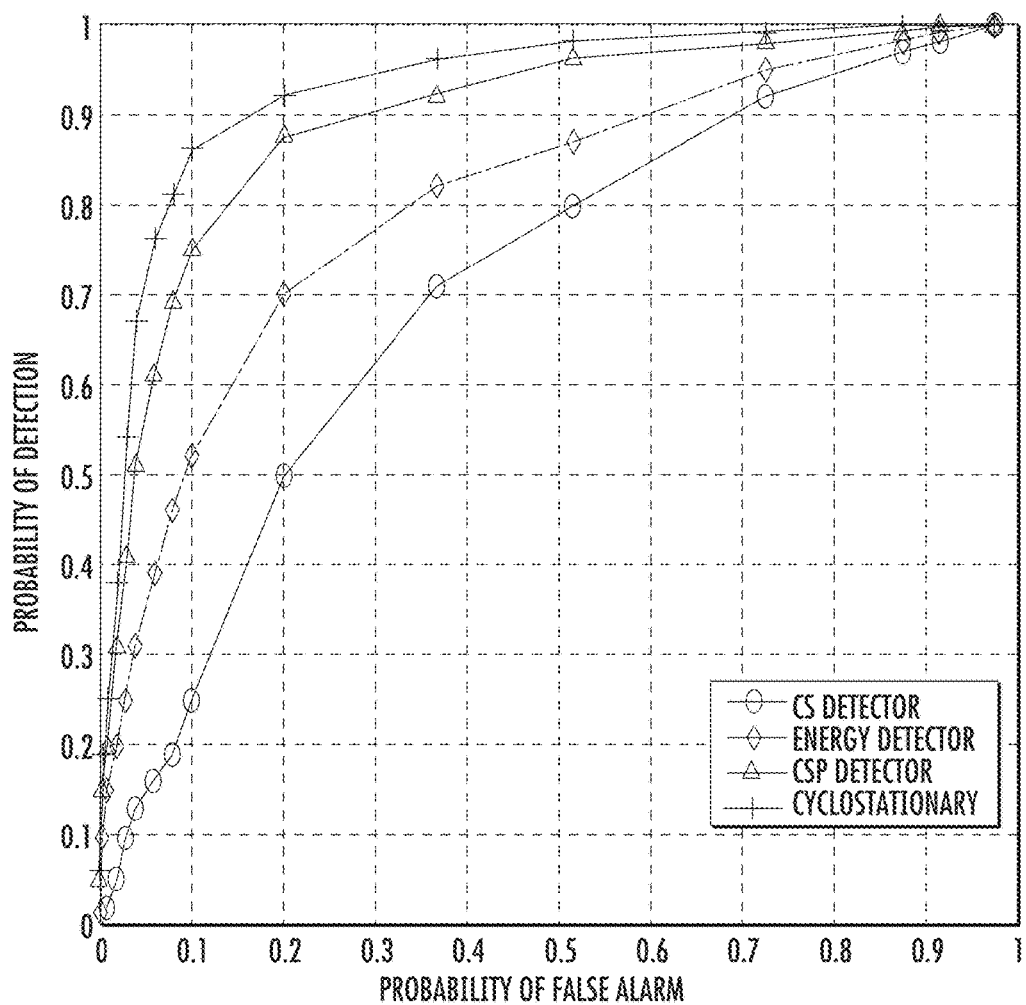
FIG. 13 shows receiver operating characteristic performance of different detection methods.
Figure 14:
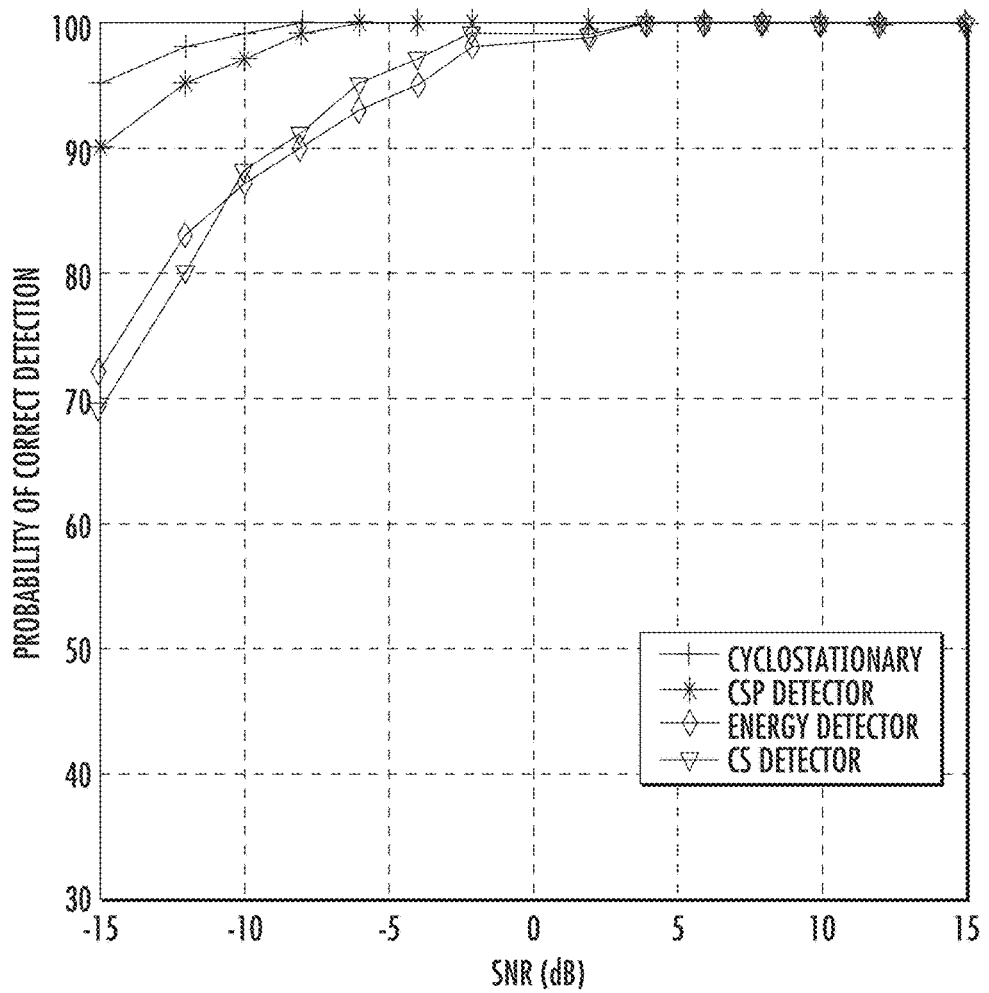
FIG. 14 shows detection probability for different signal to noise levels.
Figure 15:
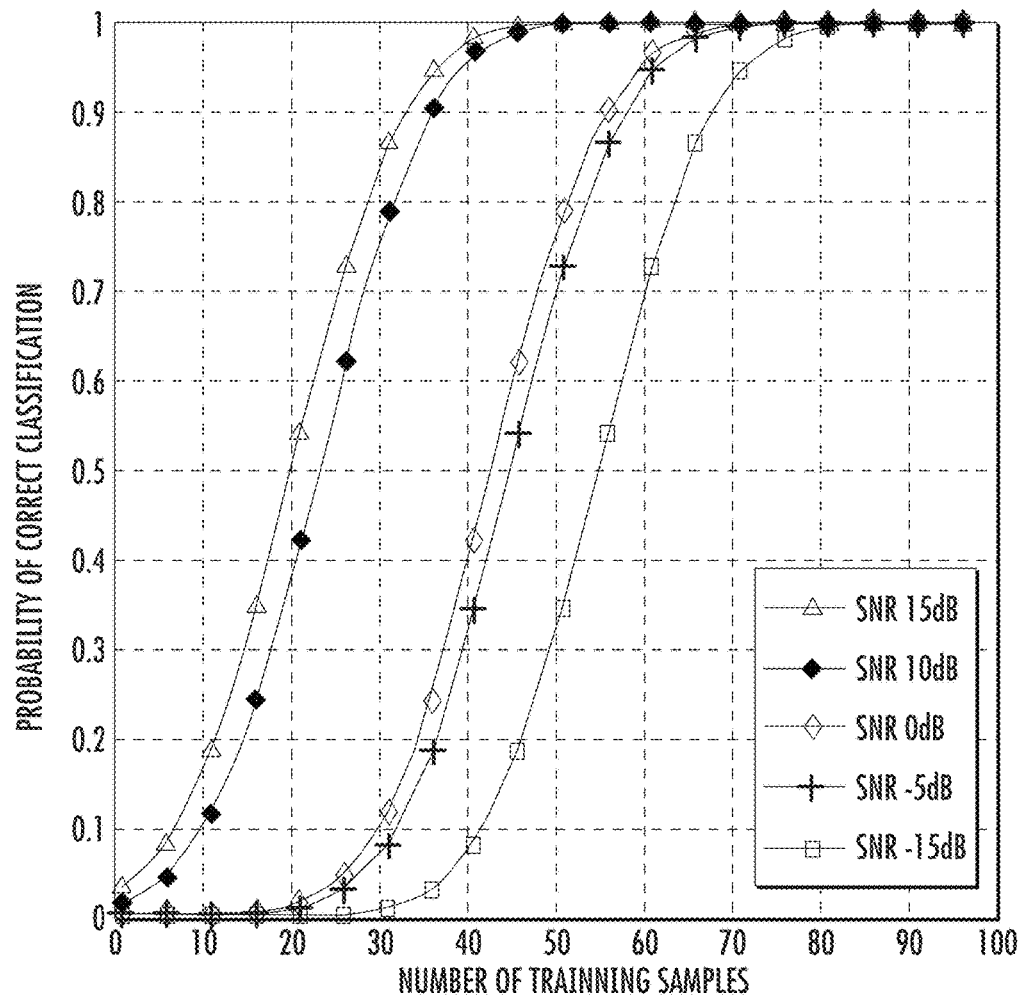
FIG. 15 Classification performance with different training sample numbers.

To testify the robustness of spectrum sensing under noise uncertainty, the receiver operating characteristic (ROC) of embodiments of the proposed compressive cyclic feature detector are compared with ROC of the energy detector, traditional CS and cyclostationary detectors. ROC can be typically used to evaluate the detector's sensitivity and accuracy, and a larger area under the curve means a better performance. As shown in FIG. 13, under a SNR of 0 dB and with a 50% compression ratio (M/N) for the CSP measurements, the performance of embodiments of the described system is much better than the energy and CS detection methods. Meanwhile, embodiments of the described system have a similar detection accuracy as the original cyclostationary feature detectors. However, in the scheme used in embodiments of the described system, the sampling rate and complexity can be reduced dramatically. Therefore both the energy consumption and sensing time for the system can be saved. FIG. 14 shows, after a fine training, the detection performance can be made better by the cyclic feature under the low SNR environment. But the detection accuracy can be reduced much more for the energy and CS detectors no matter how many samples are sensed beforehand. As seen in FIG. 15, embodiments of the new CCMP detector can correctly classify the modulation signals even under a low SNR level after training enough samples.

Figure 16:
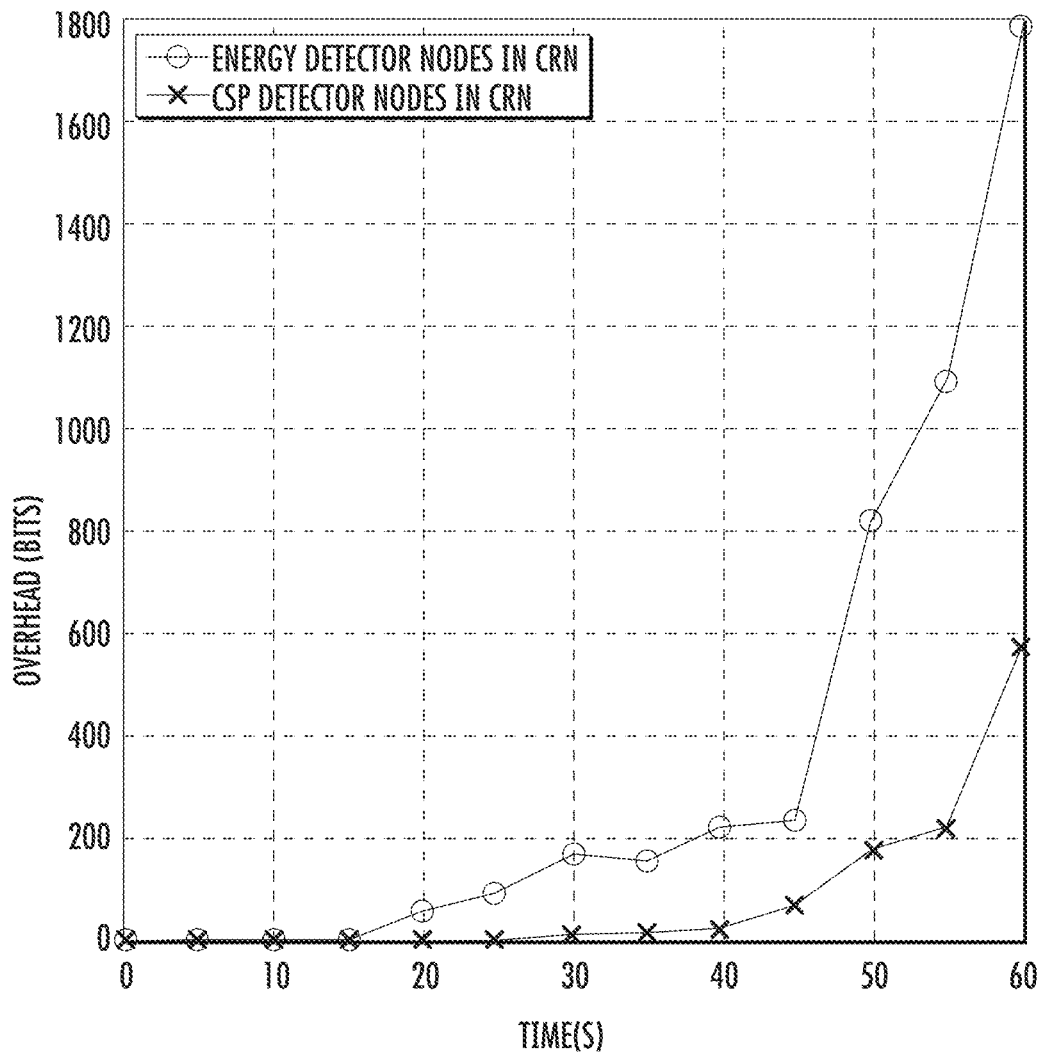
FIG. 16 shows reduced overhead in cognitive radio networks.
Figure 17:
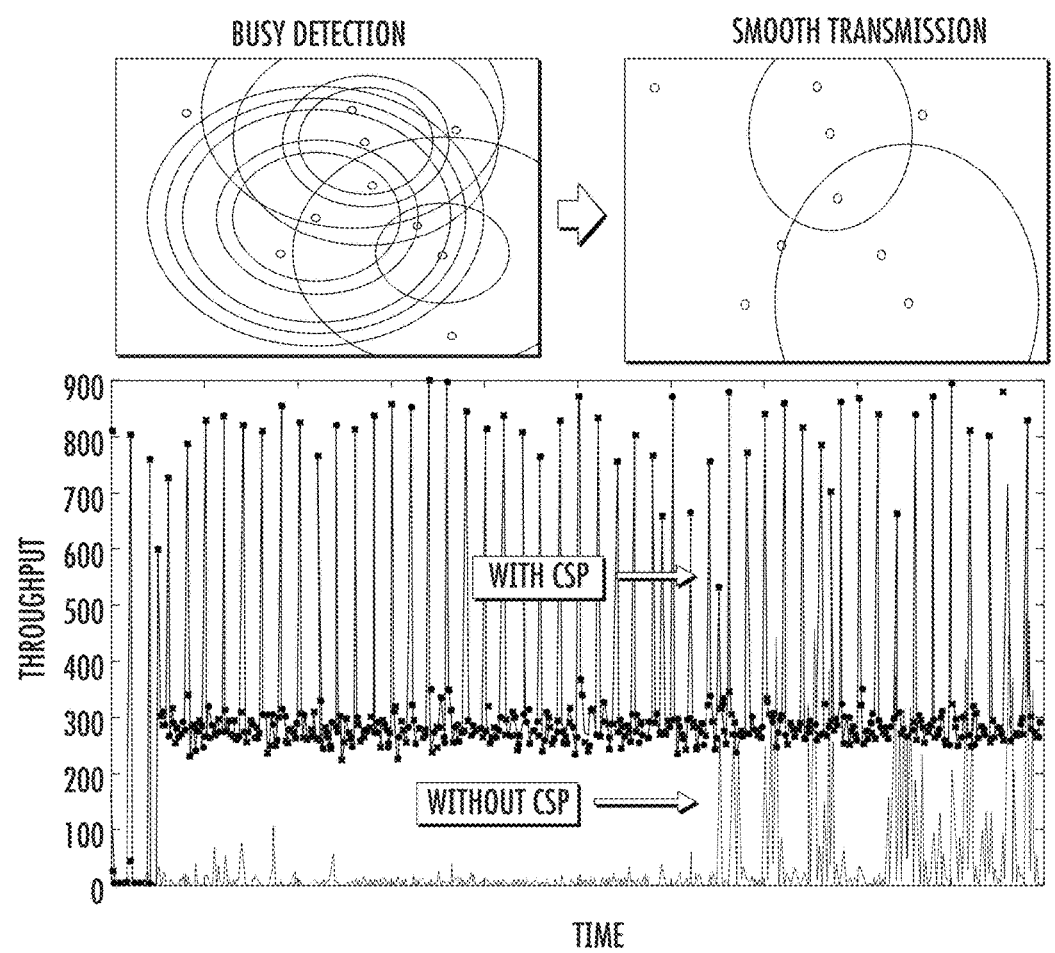
FIG. 17 shows performance in cognitive radio networks by NS2.
Figure 18:
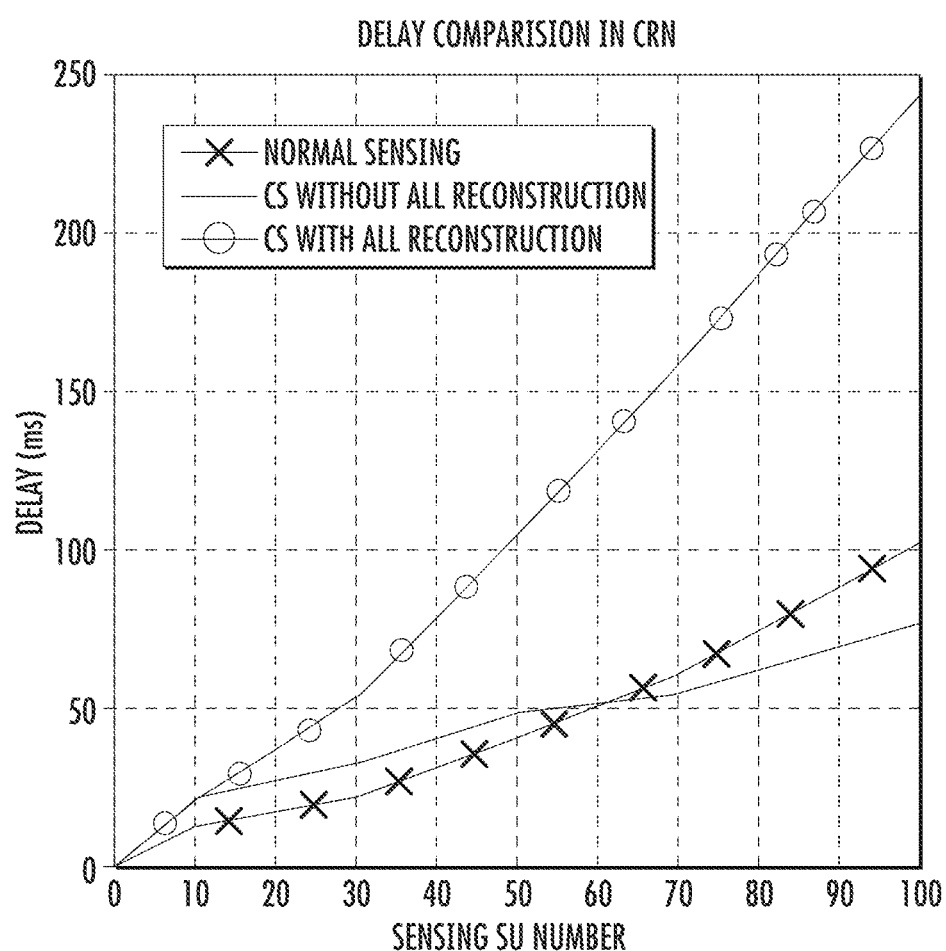
FIG. 18 shows delay performance in cognitive radio networks by NS2.

The performance improvements were verified in a NS-2 video transmission system. The results show that embodiments of the proposed detector give a much better performance in this application. In FIG. 16, more overhead can be resulted from the increased error probability. On the other hand, the high accuracy and robustness of the CSP detector helps to reduce the number of overhead packets. Therefore, a higher throughput can be achieved by the smooth transmission, as shown in FIG. 17. The non-reconstruction characteristic of the CSP detector also requires less detection time than the traditional CS detectors which need much longer time for the recovery of the signals. As can be seen in FIG. 18, after more and more nodes enter the network, the CSP detector scheme has a similar delay as the energy detector. However, embodiments of the CSP scheme have much higher spectrum detection accuracy than energy detector under noisy environment.

Figure 19:
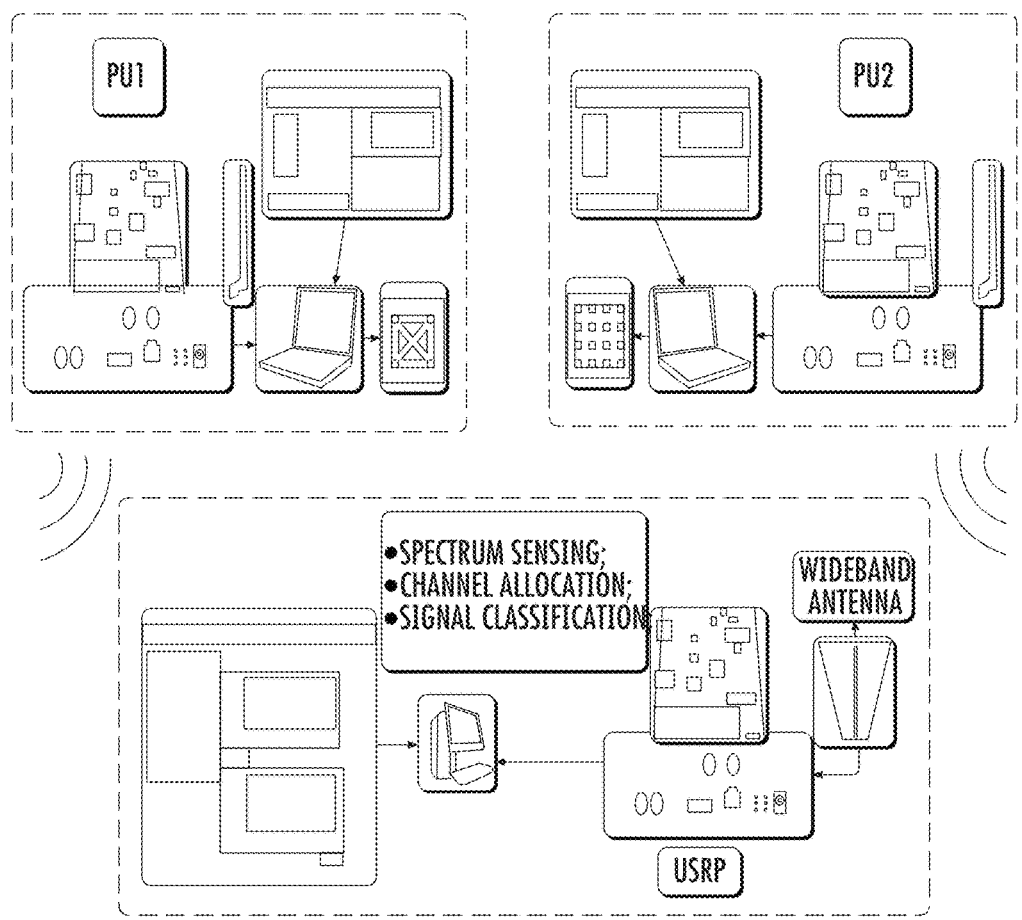
FIG. 19 shows USRP hardware and software.
Figure 20:
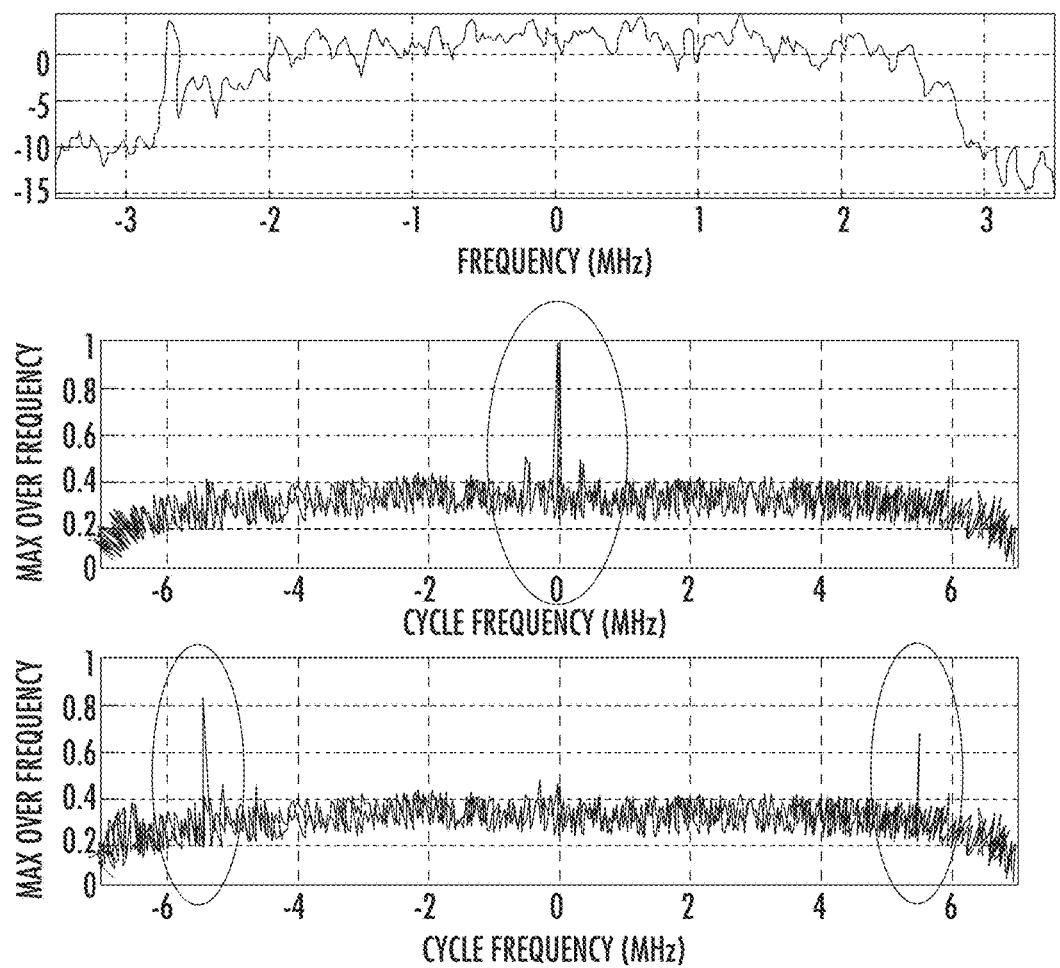
FIG. 20 shows cyclic feature extraction in USRP signals.

The NS-2 simulation results verify that the disclosed CCMP detector improves the performance of this CRN application. In addition, an embodiment of the proposed scheme was implemented for detecting and classifying the practical wireless signals by using the Universal Software Radio Peripheral (USRP). The USRP products can be computer-hosted software radios with both hardware and software platforms, and are commonly used for the implementation of the CR in the research labs. A Matt Ettus software designed radio (SDR) system was used (Ettus Research, Santa Clara, Calif.) N210 USRP, including the motherboard, wideband daughterboard and antenna, to build the hardware system (FIG. 19) and GNU radio software was used to set up the communication system to generate different modulation signals, which can be detected and classified at the SU receivers. As shown in FIG. 20, the cyclic feature of the real USRP signals can be sparse and easy to be extracted for the detection.

Figure 21:
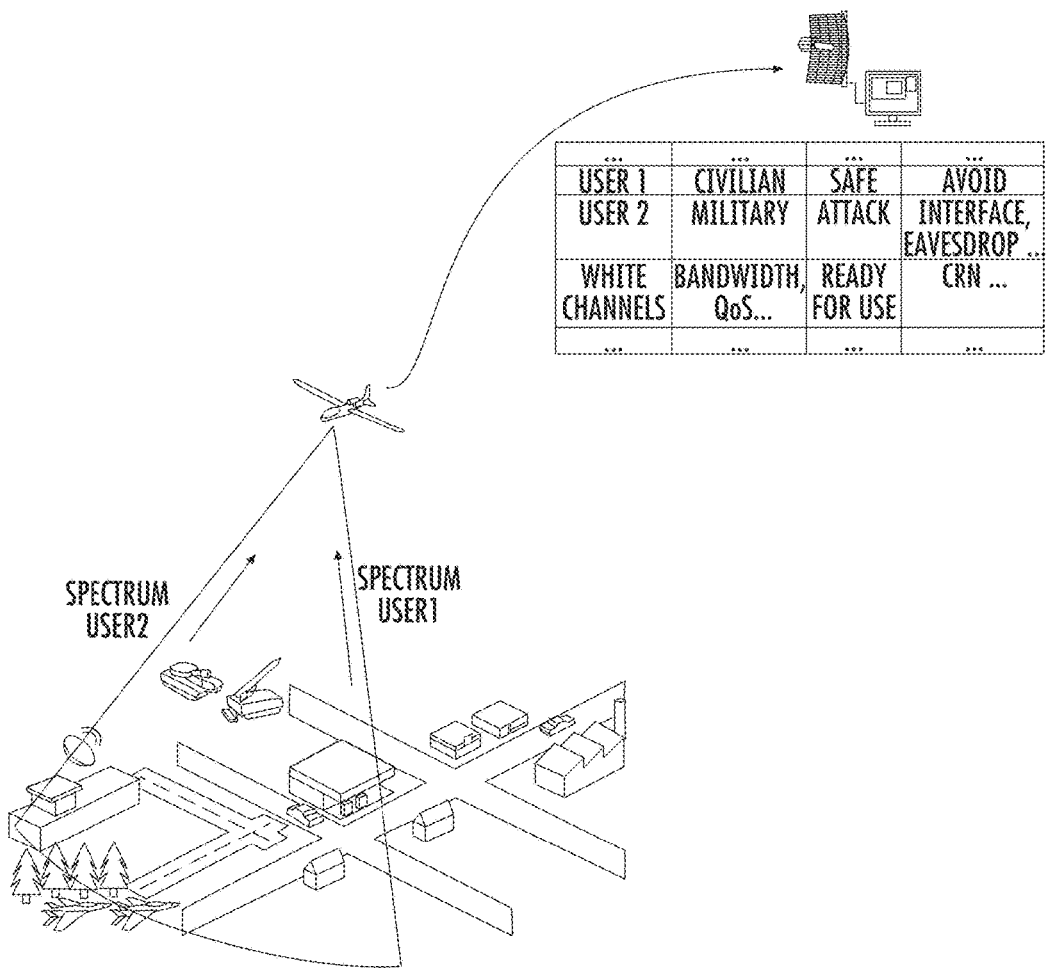
FIG. 21 shows an example application of the disclosure in low cost efficient "wideband sensing" for seamless heterogeneous advanced networking.
Figure 22:
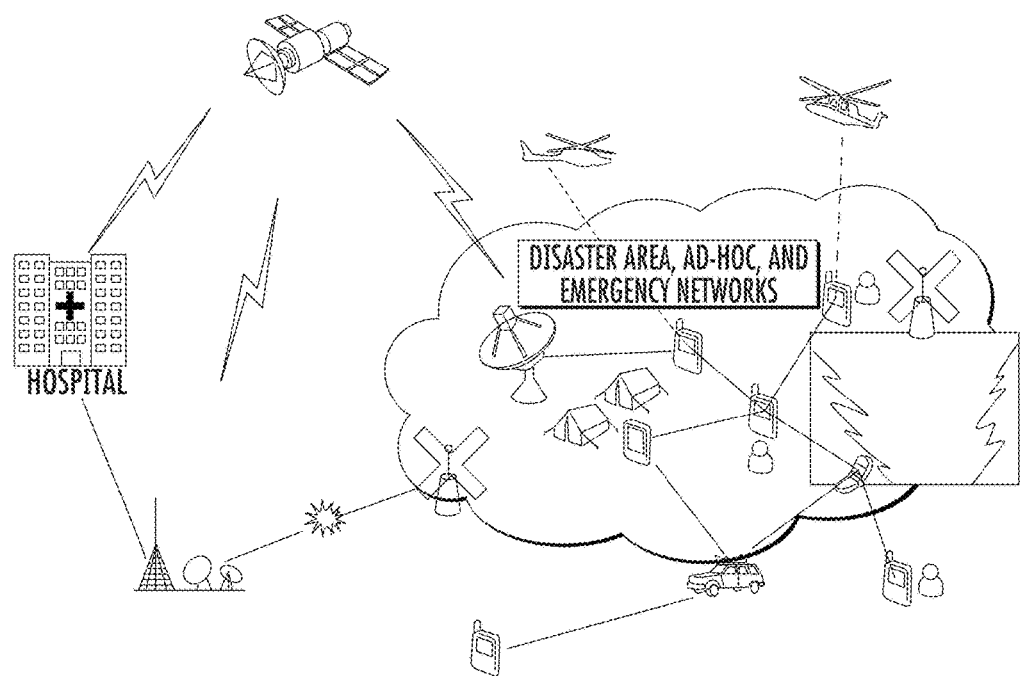
FIG. 22 shows an example application of the disclosure in low disaster communication network reconstruction.
Figure 23:
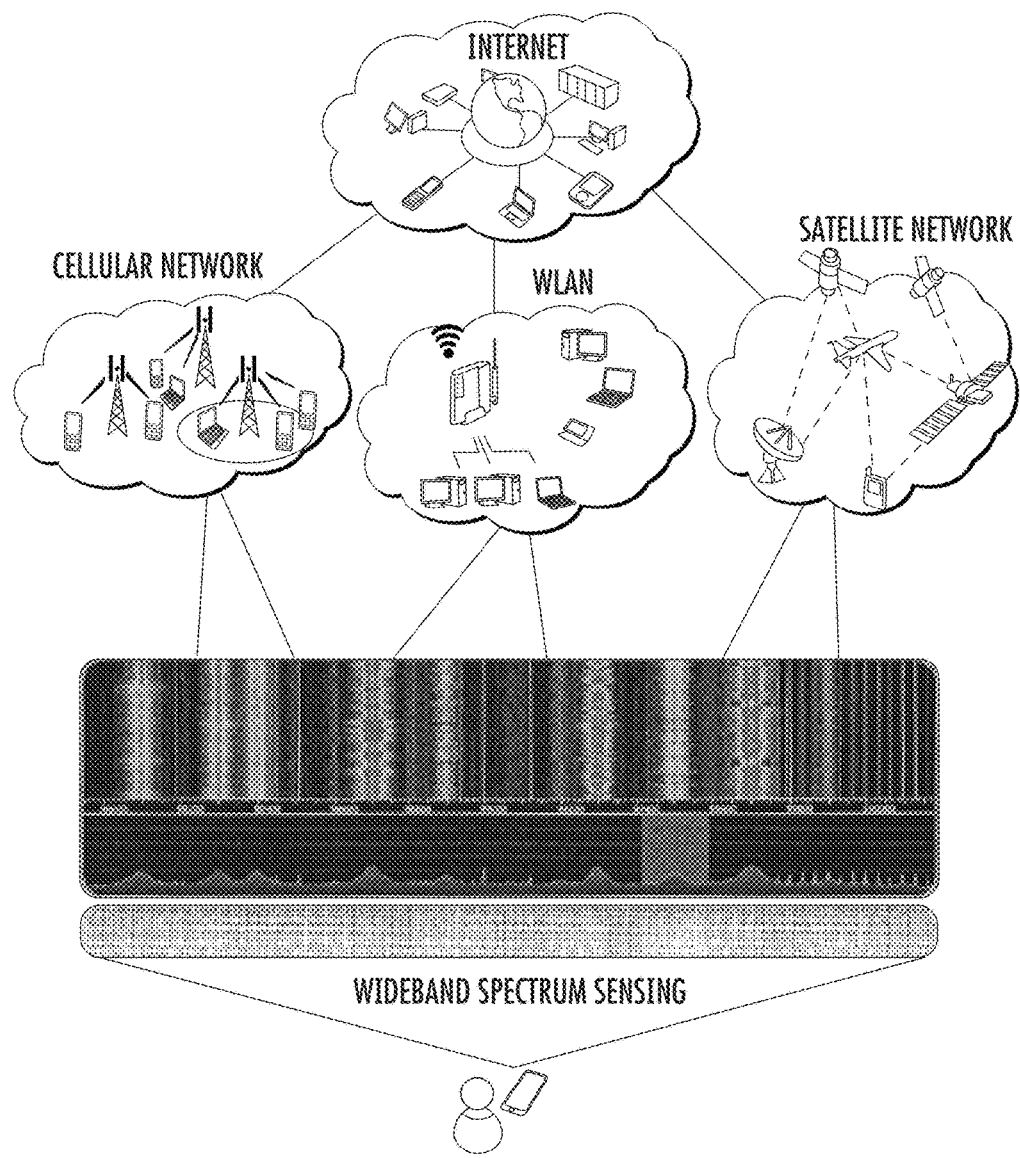
FIG. 23 shows an example application of the disclosure in low cost efficient "wideband sensing" for seamless heterogeneous advanced networking.

Additional example uses of the disclosure can be found in FIGS. 21-23 of the disclosure. FIG. 21 shows an example application of the disclosure in low cost efficient "wideband sensing" for seamless heterogeneous advanced networking. In FIG. 21, the disclosed CSP-based spectrum sensing is demonstrated to accurately detect free spectrum bands from a larger spectrum band (such as 400 MHz to 4 GHz). These free bands can be used for data transmissions for both licensed and unlicensed users.

FIG. 22 shows an example application of the disclosure in low disaster communication network reconstruction. FIG. 22 shows a possible application of the disclosed scheme in a disaster recovery system. If a disaster area does not have any network infrastructure, CRNs can be deployed to temporarily construct a wireless network. This scheme can be used in such a CRN to detect any available spectrum bands for information propagation between objects in the disaster network. For example, a sensor deployed in a wounded person's body can report data back to a doctor's computer.

FIG. 23 shows an example application of the disclosure in low cost efficient "wideband sensing" for seamless heterogeneous advanced networking. It shows an example use of the disclosed spectrum sensing scheme in heterogeneous wireless networks where different types of networks coexist in the same area. The scheme can detect unused channels for common data transmissions among such wireless networks.

Described herein are embodiments of a new compressive spectrum sensing method for cognitive radio systems. Based on the compressive sensing processing theory, a novel cyclic-featured compressive measurement matrix is designed. Both the sparse and cyclostationary features of the PUs' signals are explored in the sensing step. The detection or classification decisions are made directly on the CSP measurements without signal reconstruction. Therefore, the sensing rate, time and energy consumption are reduced, and the detection accuracy and robustness to the noise uncertainty are maintained. A framework of the CCMP detector is also developed. It has as a module an embodiment of the new CSP method with a filter bank style and can adaptively adjust the measurements based on the detection feedback. The results have shown that embodiments of the cyclic feature based CSP spectrum sensing demonstrates salient robustness to the sampling rate reduction, the training sample number decrease, and the noise uncertainty. Moreover, simulations results on a NS-2 CRN application and real wireless signals from USRP illustrate that embodiments of the CSP detector described herein significantly improve the detection performance compared to the commonly used energy detectors.

Figure 24:
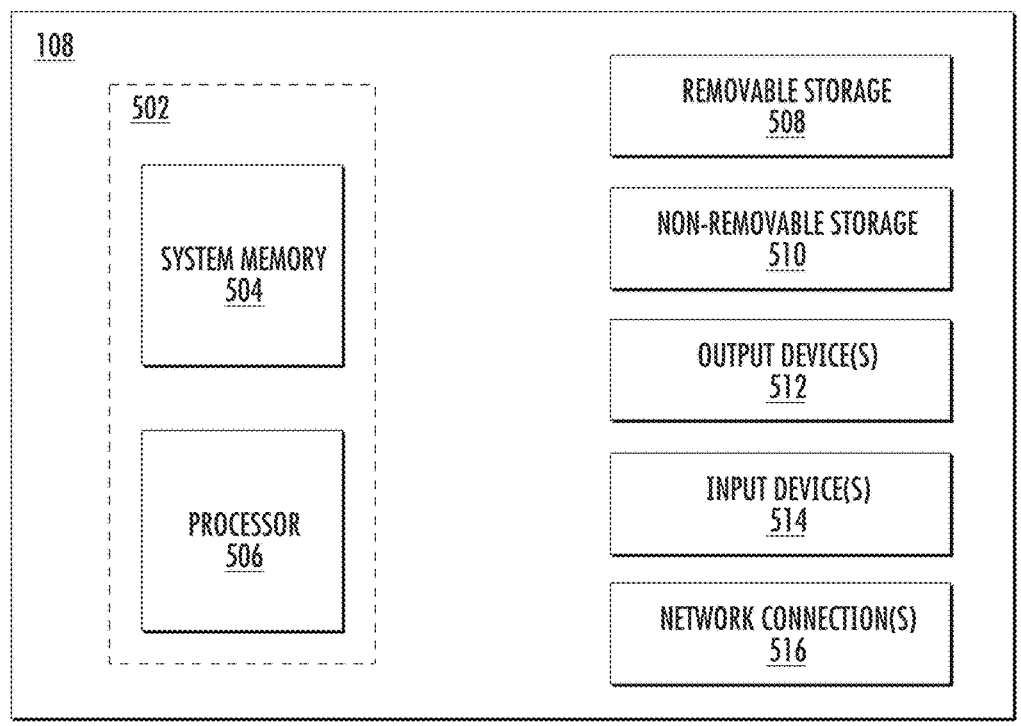
FIG. 24 illustrates an example computing device upon which embodiments of the invention may be implemented.

When the logical operations described herein are implemented in software, the process may execute on any type of computing architecture or platform. For example, referring to FIG. 24, an example computing device upon which embodiments of the invention may be implemented is illustrated. The processing unit 108 may include a bus or other communication mechanism for communicating information among various components of the processing unit 108. In its most basic configuration, processing unit 108 typically includes at least one processor 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 24 by dashed line 502. The processor 506 may be a standard programmable processor that performs arithmetic and logic operations necessary for operation of the processing unit 108.

Processing unit 108 may have additional features/functionality. For example, processing unit 108 may include additional storage such as removable storage 508 and non-removable storage 510 including, but not limited to, magnetic or optical disks or tapes. Processing unit 108 may also contain network connection(s) 516 that allow the device to communicate with other devices. Processing unit 108 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the processing unit 108. All these devices are well known in the art and need not be discussed at length here.

The processor 406 may be configured to execute program code encoded in tangible, computer-readable media. Computer-readable media refers to any media that is capable of providing data that causes the processing unit 108 (i.e., a machine) to operate in a particular fashion. Various computer-readable media may be utilized to provide instructions to the processor 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processor 406 may execute program code stored in the system memory 504. For example, the bus may carry data to the system memory 504, from which the processor 506 receives and executes instructions. The data received by the system memory 504 may optionally be stored on the removable storage 508 or the non-removable storage 510 before or after execution by the processor 506.

Processing unit 108 typically includes a variety of computer-readable media. Computer-readable media can be any available media that can be accessed by device 108 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing unit 108. Any such computer storage media may be part of processing unit 108.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for cognitive radio spectrum sensing of a signal, the method comprising:

applying one or more pre-defined cyclostationary feature to a received signal having a wide spectrum to detect the presence of one or more modulated signals therein, wherein each of the one or more pre-defined cyclostationary feature is sparsely applied by randomly sampling over a pre-defined cyclic frequency domain of the received signal; and applying a reconstruction-less compressive sensing process comprising a matrix transform operation that structures nonlinear combination of low-rate samples of the modulation signals in the cyclic domain to generate a measurement matrix to classify the received signal based on the one or more applied pre-defined cyclostationary feature, wherein spectrums of the one or more modulation signals are sensed, via classification of patterns in the measurement matrix, without any reconstruction operation of the one or more modulation signals or signals associated therewith, including a L1 and/or L2 norm reconstruction operation.

2. The method of claim 1, wherein the one or more pre-defined cyclostationary feature is sparsely applied in time, space, frequency, or code domains.

3. The method of claim 1, wherein the one or more pre-defined cyclostationary feature is sparsely applied by a front-end detector, wherein the front-end detector is configured to compressively sense the one or more pre-defined cyclostationary feature based on a set of known or expected carrier frequency of the signal and a set of known or expected symbol rate of the received signal.

4. The method of claim 3, wherein the front-end detector is configured to perform random noise sampling of the received signal using PN coding and Benoulli coding.

5. The method of claim 3, wherein the front-end detector comprises an adjustable filter bank configured to separate wide-band input of the received signal into a plurality of channels, the adjustable filter bank being configured to adaptively adjust a bandwidth and a measurement size of the separation of the wide-band input based on an assessed distance measurement of spectrum of the received signal.

6. The method of claim 3, wherein the front-end detector comprises a pulse shape filter.

7. The method of claim 1, wherein the cyclic frequency domain is defined by a frequency value of the signal and a cycle frequency value of the signal.

8. The method of claim 1, wherein the measurement matrix is implemented, in part, as a statistical estimator configured to perform a spectrum correlation function of the received signal to extract cyclic feature to detect the presence of the one or more modulated signals in the received signal.

9. The method of claim 1, wherein the measurement matrix is determined in a sparse domain of the signal, and wherein the measurement matrix satisfies a restricted isometry property.

10. The method of claim 1, wherein the measurement matrix is implemented, in part, as a classifier configured to project each candidate signal onto a compressed space and classifying signals according to a nearest neighbor in the compressed space.

11. The method of claim 10, wherein the classifier is based on a support vector machine (SVM) classifier or a k-nearest neighbors (KNN) classifier.

12. A system for cognitive radio spectrum sensing of a signal, the system comprising:

a detector configured to:

apply one or more pre-defined cyclostationary features to a received signal having a wide spectrum to detect the presence of one or more modulated signals therein, wherein each of the one or more pre-defined cyclostationary features is sparsely applied by randomly sampling over a pre-defined cyclic frequency domain of the received signal; and apply a reconstruction-less compressive sensing process comprising a matrix transform that structures nonlinear combination of low-rate samples of the modulation signals in the cyclic domain to generate a measurement matrix to classify the signal based on the received one or more applied pre-defined cyclostationary feature, wherein spectrums of the one or more modulation signals are sensed, via classification of patterns in the measurement matrix, without reconstruction of the one or more modulation signals or signals associated therewith, including a L1-norm reconstruction operation.

13. The system of claim 12, wherein the detector comprises a front-end detector configured to sparsely apply the one or more pre-defined cyclostationary feature based on a set of known or expected carrier frequency of the signal and a set of known or expected symbol rate of the received signal.

14. The system of claim 13, wherein the front-end detector is configured to perform random noise sampling of the received signal using PN coding and Benoulli coding.

15. The system, of claim 12, wherein the cyclic frequency domain is defined by a frequency value of the signal and a cycle frequency value of the signal.

16. The system of claim 12, wherein the detector comprises a statistical estimator configured to implement a portion of the measurement matrix by performing a spectrum correlation function of the received signal to extract cyclic feature to detect the presence of the one or more modulated signals in the received signal.

17. The system of claim 12, wherein the measurement matrix is determined in a sparse domain of the signal, and wherein the measurement matrix satisfies a restricted isometry property.

18. The system of claim 12, wherein the detector comprises a classifier configured to implement a portion of the measurement matrix by projecting each candidate signal onto a compressed space and classifying signals according to a nearest neighbor in the compressed space.

19. The system of claim 12, wherein the detector comprises an adjustable filter bank configured to implement a part of the measurement matrix, wherein the adjustable filter bank is configured to separate wide-band input of the received signal into a plurality of channels, and wherein the adjustable filter bank is configured to adaptively adjust system parameters of the adjustable filter bank comprising a bandwidth and a measurement size based on the spectrum of the signal.

20. A system for cognitive radio spectrum sensing of a signal, the system comprising:

a cyclostationary compressive measurement processing detector configured to apply one or more pre-defined cyclostationary features to a received signal having a wide spectrum to detect the presence of one or more modulated signals therein, wherein each of the one or more pre-defined cyclostationary features is sparsely applied by randomly sampling over a pre-defined cyclic frequency domain of the received signal;

a classifier configured to apply a reconstruction-less compressive sensing process comprising a matrix transform operation that structures nonlinear combination of low-rate samples of the modulation signals in the cyclic domain to generate a measurement matrix to classify the received signal based on the one or more applied pre-defined cyclostationary feature, wherein spectrums of the one or more modulation signals are sensed, via classification of patterns in the measurement matrix, without any reconstruction operation of the one or more modulation signals or signals associated therewith, including a L1 and/or L2 norm reconstruction operation.

* * * * *